United States Patent
Yamamoto et al.

(10) Patent No.: US 7,506,117 B2
(45) Date of Patent: Mar. 17, 2009

(54) DATA RECOVERY METHOD FOR COMPUTER SYSTEM

(75) Inventors: Masayuki Yamamoto, Sagamihara (JP); Masayasu Asano, Yokohama (JP); Takashi Oeda, Sagamihara (JP); Tomohiko Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 11/340,280

(22) Filed: Jan. 25, 2006

(65) Prior Publication Data

US 2007/0174694 A1     Jul. 26, 2007

(30) Foreign Application Priority Data

Nov. 16, 2005   (JP)   ............... 2005-331864

(51) Int. Cl.
*G06F 12/16* (2006.01)
(52) U.S. Cl. ................ 711/162; 711/161; 714/2; 714/6; 714/15
(58) Field of Classification Search ........ None
See application file for complete search history.

(56) References Cited

U.S. PATENT DOCUMENTS

| | | | |
|---|---|---|---|
| 2003/0196052 A1* | 10/2003 | Bolik et al. | 711/162 |
| 2004/0193945 A1* | 9/2004 | Eguchi et al. | 714/6 |
| 2004/0268067 A1 | 12/2004 | Yamagami | |
| 2005/0022213 A1 | 1/2005 | Yamagami et al. | |
| 2005/0081006 A1* | 4/2005 | Shackelford et al. | 711/162 |
| 2005/0108565 A1 | 5/2005 | Blea et al. | |
| 2005/0235016 A1 | 10/2005 | Takeshi et al. | |

FOREIGN PATENT DOCUMENTS

| | | |
|---|---|---|
| EP | 1455275 A2 | 9/2004 |
| JP | 2005-018738 | 1/2005 |

OTHER PUBLICATIONS

European Search Report for patent application EP06253254 (Mar. 3, 2008).

* cited by examiner

*Primary Examiner*—Kevin L Ellis
*Assistant Examiner*—Alan M Otto
(74) *Attorney, Agent, or Firm*—Townsend and Townsend and Crew LLP

(57) ABSTRACT

To reduce a burden imposed on a system administrator in restore operation, there is provided a computer system including at least one storage system, at least one host computer, and a management computer, in which: the storage system includes: a first processor; a first memory; and a disk drive; the host computer includes: a second processor; and a second memory; the management computer includes: a third processor; and a third memory; the second processor executes plurality of applications; the first processor and the second processor create check points to be used to maintain consistency of data at predetermined timing for the respective applications; and a third processor obtains recovery conditions, which are conditions for a check point to be used for a recovery, and identifies a check point, which satisfies the obtained conditions, from the created check points for the respective applications.

19 Claims, 25 Drawing Sheets

LU MANAGEMENT TABLE

CP TABLE

|  | 22210 | 22220 | 22230 |
|---|---|---|---|
| | VOL ID | HOST ALLOCATION | CAPACITY |
| | st1v1 | YES | 100GB |
| | st1v2 | YES | 100GB |
| | st1v3 | YES | 100GB |
| | st1v4 | NO | 100GB |

22200

VOL TABLE

FIG. 9

|  | 22310 | 22320 | 22330 |
|---|---|---|---|
| | VOL GROUP ID | DATA VOL ID | JNL VOL ID |
| | st1G1 | st1v3 | st1v5 |

22300

JNL VOL TABLE

FIG. 10

| VOL GROUP ID | DATA VOL ID | CP ID | SEQUENCE NUMBER | BASE VOL ID | TIME POINT |
| --- | --- | --- | --- | --- | --- |
| st1G1 | st1v3 | ST1 - 10 | 100 | st1v30 | 2005/01/01 09:00 |
| | | ST1 - 11 | 205 | st1v30 | 2005/01/01 09:10 |
| | | ST1 - 12 | 310 | st1v30 | 2005/01/01 09:20 |
| | | ST1 - 13 | 400 | st1v30 | 2005/01/01 09:30 |
| | | ST1 - 14 | 450 | st1v30 | 2005/01/01 09:40 |
| | | ST1 - 15 | 580 | st1v30 | 2005/01/01 09:50 |
| | | ST1 - 16 | 600 | st1v31 | 2005/01/01 10:00 |
| | | ST1 - 17 | 620 | st1v31 | 2005/01/01 10:10 |
| | | ST1 - 18 | 660 | st1v31 | 2005/01/01 10:20 |
| | | ST1 - 19 | 710 | st1v31 | 2005/01/01 10:30 |
| | | ST1 - 20 | 780 | st1v31 | 2005/01/01 10:40 |
| | | ST1 - 21 | 800 | st1v31 | 2005/01/01 10:50 |
| | | ST1 - 22 | 810 | st1v32 | 2005/01/01 11:00 |
| | | ST1 - 23 | 815 | st1v32 | 2005/01/01 11:10 |
| | | ST1 - 24 | 900 | st1v32 | 2005/01/01 11:20 |

CP TABLE

*FIG. 11*

| 43110 | 43120 | 43130 | 43140 |
|---|---|---|---|
| DEVICE ID | DEVICE TYPE | DEVICE INFORMATION | IP ADDRESS |
| ST1 | STORAGE | VENDOR A, MODEL A1, SERIAL NUMBER 10 | 10.10.10.10 |
| H1 | HOST COMPUTER | VENDOR B, MODEL B1, SERIAL NUMBER 11 | 10.10.10.11 |

43100

DEVICE TABLE

*FIG. 12*

| RECOVERY GROUP ID 43210 | RECOVERY GROUP NAME 43220 | SUBJECT LU (HOST ID – LU ID) 43230 | MASTER LU 43240 | CP CREATION (COMMAND, INTERVAL) 43250 | CP INFORMATION ACQUISITION (COMMAND, INTERVAL) 43260 | RECOVERY EXECUTION COMMAND 43270 | RPO WORST VALUE 43280 | CP TIME DIFFERENCE 43290 |
|---|---|---|---|---|---|---|---|---|
| RCV1 | RCVH1 | H1 – LU1 | X | xxx1, 35 MINUTES | yyy1, 60 MINUTES | zzz1 | 60 MINUTES | 10 MINUTES |
| | | H1 – LU3 | N/A | xxx2, 10 MINUTES | yyy2, 60 MINUTES | zzz2 | | |

43200 RECOVERY GROUP TABLE

*FIG. 13*

CP GROUP TABLE

| CP GROUP ID 43310 | RECOVERY GROUP ID 43320 | MASTER CP (MASTER LU ID, CP ID) 43330 | NON-MASTER CP (NON-MASTER LU ID, CP ID) 43340 | RPO 43350 | CP TIME DIFFERENCE 43360 |
|---|---|---|---|---|---|
| RCV1 - P1 | RCV1 | H1 - LU1, DBMS - 103 | H1 - LU3, ST1 - 21 | 25 MINUTES | 5 MINUTES |
| RCV1 - P2 | | H1 - LU1, DBMS - 103 | H1 - LU3, ST1 - 20 | 30 MINUTES | 5 MINUTES |
| RCV1 - P3 | | H1 - LU1, DBMS - 102 | H1 - LU3, ST1 - 18 | 60 MINUTES | 10 MINUTES |
| RCV1 - P4 | | H1 - LU1, DBMS - 102 | H1 - LU3, ST1 - 17 | 60 MINUTES | 0 MINUTES |

43300

| RECOVERY GROUP ID 43410 | LU ID (HOST ID – LU ID) 43420 | MASTER LU 43430 | CP ID 43440 | TIME POINT 43450 |
|---|---|---|---|---|
| RCV1 | H1 - LU1 | X | DBMS - 100 | 2005/01/01 09:00 |
| | H1 - LU1 | X | DBMS - 101 | 2005/01/01 09:35 |
| | H1 - LU3 | N/A | ST1 - 10 | 2005/01/01 09:00 |
| | H1 - LU3 | N/A | ST1 - 11 | 2005/01/01 09:10 |
| | H1 - LU3 | N/A | ST1 - 12 | 2005/01/01 09:20 |
| | H1 - LU3 | N/A | ST1 - 13 | 2005/01/01 09:30 |
| | H1 - LU3 | N/A | ST1 - 14 | 2005/01/01 09:40 |
| | H1 - LU3 | N/A | ST1 - 15 | 2005/01/01 09:50 |
| | H1 - LU1 | X | DBMS - 102 | 2005/01/01 10:10 |
| | H1 - LU1 | X | DBMS - 103 | 2005/01/01 10:45 |
| | H1 - LU3 | N/A | ST1 - 16 | 2005/01/01 10:00 |
| | H1 - LU3 | N/A | ST1 - 17 | 2005/01/01 10:10 |
| | H1 - LU3 | N/A | ST1 - 18 | 2005/01/01 10:20 |
| | H1 - LU3 | N/A | ST1 - 19 | 2005/01/01 10:30 |
| | H1 - LU3 | N/A | ST1 - 20 | 2005/01/01 10:40 |
| | H1 - LU3 | N/A | ST1 - 21 | 2005/01/01 10:50 |
| | H1 - LU1 | X | DBMS - 104 | 2005/01/01 11:20 |
| | H1 - LU3 | N/A | ST1 - 22 | 2005/01/01 11:00 |
| | H1 - LU3 | N/A | ST1 - 23 | 2005/01/01 11:10 |
| | H1 - LU3 | N/A | ST1 - 24 | 2005/01/01 11:20 |

43400

CP HISTORY TABLE

CP GROUP CANDIDATE SELECTION SCREEN — 92000

GROUP NAME: RCVH1 — 92010

MASTER LU ID: H1 - LU1 — 92020

RECOVERY EVENT GENERATION TIME POINT: 2005/01/01 11:10 — 92030

CP GROUP SELECTION:

| SELECTION | MASTER CP | NON - MASTER CP | RPO | CP TIME DIFFERENCE |
|---|---|---|---|---|
| X | DBMS - 103 (2005/01/01 10:45) | ST1 - 21 (2005/01/01 10:50) | 25 MINUTES | 5 MINUTES |
| | DBMS - 103 (2005/01/01 10:45) | ST1 - 20 (2005/01/01 10:40) | 30 MINUTES | 5 MINUTES |
| | DBMS - 102 (2005/01/01 10:10) | ST1 - 18 (2005/01/01 10:20) | 60 MINUTES | 10 MINUTES |
| | DBMS - 102 (2005/01/01 10:10) | ST1 - 17 (2005/01/01 10:10) | 60 MINUTES | 0 MINUTES |

92041  43330  43340  43350  43360
43300  92050  [RECOVER]

FIG. 20

| LOG ID | TIME POINT | LOG DESCRIPTION |
|---|---|---|
| H1 - 001 | 2005/01/01 10:00 | USER aaa HAS LOGGED IN |
| H1 - 002 | 2005/01/01 11:10 | USER xyz HAS LOGGED IN |
| H1 - 003 | 2005/01/01 11:30 | USER xyz HAS LOGGED OUT |

DATA RECOVERY METHOD FOR COMPUTER SYSTEM

CLAIM OF PRIORITY

The present application claims priority from Japanese patent application P2005-331864 filed on Nov. 16, 2005, the content of which is hereby incorporated by reference into this application.

BACKGROUND

This invention relates to a computer system including storage systems, host computers, and a management computer, and more particularly to a technology for restoring backup data.

The computer system which includes the host computers and the storage systems should prevent data loss even when an unexpected accident, disaster, or the like occurs. For that purpose, data in the storage system provided for the computer system are stored in (backed up to) tapes or other storage systems. When a failure occurs, the computer system uses the backup data to recover (restore) data.

It is necessary for the computer system to restore the data with an RTO (Recovery Time Objective) and an RPO (Recovery Point Objective) being reduced.

The RTO refers to a time required for a recovery processing of the computer system. Specifically, the RTO is a difference in time between a time point when the computer system stops and a time point when the computer system is recovered. The RPO is a value indicating freshness of data used to recover the computer system. Specifically, the RPO is a difference in time between a time point when the computer system stops and a check point (CP) to which the computer system is recovered.

JP 2005-18738 A discloses a computer system which is capable of performing restore operation with the reduced RPO and RTO. According to this computer system, a storage system stores journal data each time data to which a host computer has issued a write request is stored in a volume. Then, in the computer system, the journal data stored in the storage system is used to restore the data. According to this configuration, even when an application executed by the host computer does not store journal data, data can be restored in the computer system.

SUMMARY

However, in the computer system according to the related art, a failure occurring in the course of storing data in the volume of the storage system by the host computer leads to a problem. If computer system restores data, inconsistency is produced in the restored data.

To address this problem, in an actual computer system, a host computer provided in the computer system forcedly outputs data in the memory thereof periodically to a volume of a storage system. The computer system records a time point when the data is forcedly output as the CP. The computer system uses journal data of a time point corresponding a CP to restore data.

A length of each interval between creations of CPs depends on applications. In a restore operation of a computer system including plurality of applications, a system administrator has to select a CP properly for the respective applications. Thus, there is a problem in that a restore operation of a computer system including a large number of applications operating cooperatively increases a burden imposed on a system administrator.

It is therefore an object of this invention to provide a computer system capable of reducing a burden imposed on a system administrator in restore operation.

According to an aspect of this invention, there is provided a computer system including at least one storage system, at least one host computer that is connected to the storage system via a network, and a management computer that is connected to the storage system and the host computer, in which the storage system includes a first interface that is connected to the network, a first processor that is connected to the first interface, a first memory that is connected to the first processor, and a disk drive that stores data to which a write request is issued by the host computer; the host computer includes a second interface that is connected to the network, a second processor that is connected to the second interface, and a second memory that is connected to the second processor; the management computer includes a third interface that is connected to another device, a third processor that is connected to the third interface, and a third memory that is connected to the third processor; the second processor executes a plurality of applications; the first processor: provides the host computer with a storage area of the disk drive as at least one logical storage area; allocates the logical storage area to each of the plurality of applications; creates first journal data which is data updated by at least one of the plurality of applications; and creates first check points which maintain consistency of the created first journal data for the respective applications at predetermined timing; the second processor: creates second journal data which is data updated by at least one of the plurality of applications; and creates second check points which maintains consistency of the created second journal data for the respective applications at predetermined timing; the third processor: obtains a recovery condition which is a condition for a check point used for a recovery; and identifies at least one check point which satisfies the obtained recovery condition from the created first and second check points for the respective applications.

According to an aspect of this invention, it is possible to reduce a burden imposed on a system administer in a restore operation of a computer system.

BRIEF DESCRIPTION OF THE DRAWINGS

The present invention can be appreciated by the description which follows in conjunction with the following figures, wherein:

FIG. 9 is a configuration diagram of a VOL table of the storage system according to the first embodiment;

FIG. 10 is a configuration diagram of a JNL VOL table of the storage system according to the first embodiment;

FIG. 11 is a configuration diagram of a CP table of the storage system according to the first embodiment;

FIG. 12 is a configuration diagram of a device table of the management computer according to the first embodiment;

FIG. 13 is a configuration diagram of a recovery group table of the management computer according to the first embodiment;

FIG. 20 describes a CP group candidate selection screen displayed by the management computer according to the first embodiment;

FIG. 25 is a configuration diagram of a consolidated event log table of the management computer according to the second embodiment.

DETAILED DESCRIPTION OF THE PREFERRED EMBODIMENTS

A description will be given of embodiments of this invention with reference to drawings.

First Embodiment

Figure 1:
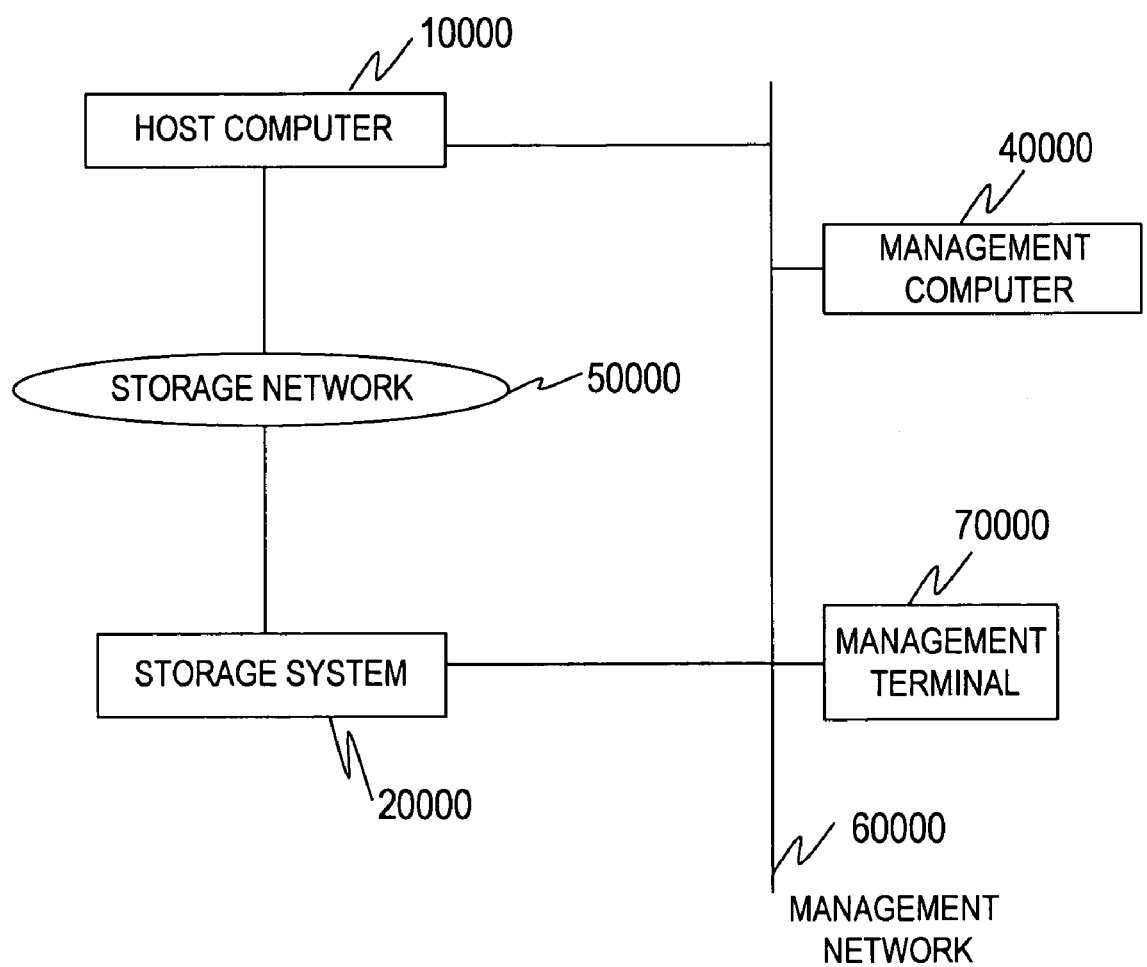
FIG. 1 is a block diagram of a computer system according to a first embodiment.

FIG. 1 is a block diagram of a computer system according to a first embodiment.

The computer system includes a host computer 10000, a storage system 20000, a management computer 40000, and a management terminal 70000. Though only one host computer 10000 is shown, there may be a plurality of host computers 10000. Similarly, though only one storage system 20000 is shown, there may be a plurality of storage systems 20000.

The host computer 10000 and the storage system 20000 are connected with each other via a storage network 50000. The storage network 50000 is a network employing the Fibre Channel protocol, for example, and may include one ore more connection devices.

Moreover, the host computer 10000 and the storage system 20000 are connected to the management computer 40000 via a management network 60000. Similarly, the host computer 10000 and the storage system 20000 are connected to the management terminal 70000 via the management network 60000. The management network 60000 is a network employing the IP protocol, for example, and may include one ore more connection devices.

The host computer 10000 will be described later with reference to FIG. 2. The host computer 10000 writes data in the storage system 20000. The host computer 10000 recognizes a storage area of the storage system 20000 in units of a logical storage area (LU: Logical Unit). The storage system 20000 will be described later with reference to FIG. 3. The storage system 20000 stores data to which the host computer 10000 issues a write request.

The management computer 40000 will be described later with reference to FIG. 5. The management computer 40000 manages the host computer 10000 and the storage system 20000.

The management terminal 70000 will be described later with reference to FIG. 6 The management terminal 70000 requests the management computer 40000 to execute programs. In other words, a system administrator can operate the management terminal 70000 to request the remote management computer 40000 to execute the program. When the management computer 40000 receives a request from the management terminal 70000, the management computer 40000 executes the requested program.

It should be noted that the system administrator may directly operate the management computer 40000 to execute the program.

Figure 2:
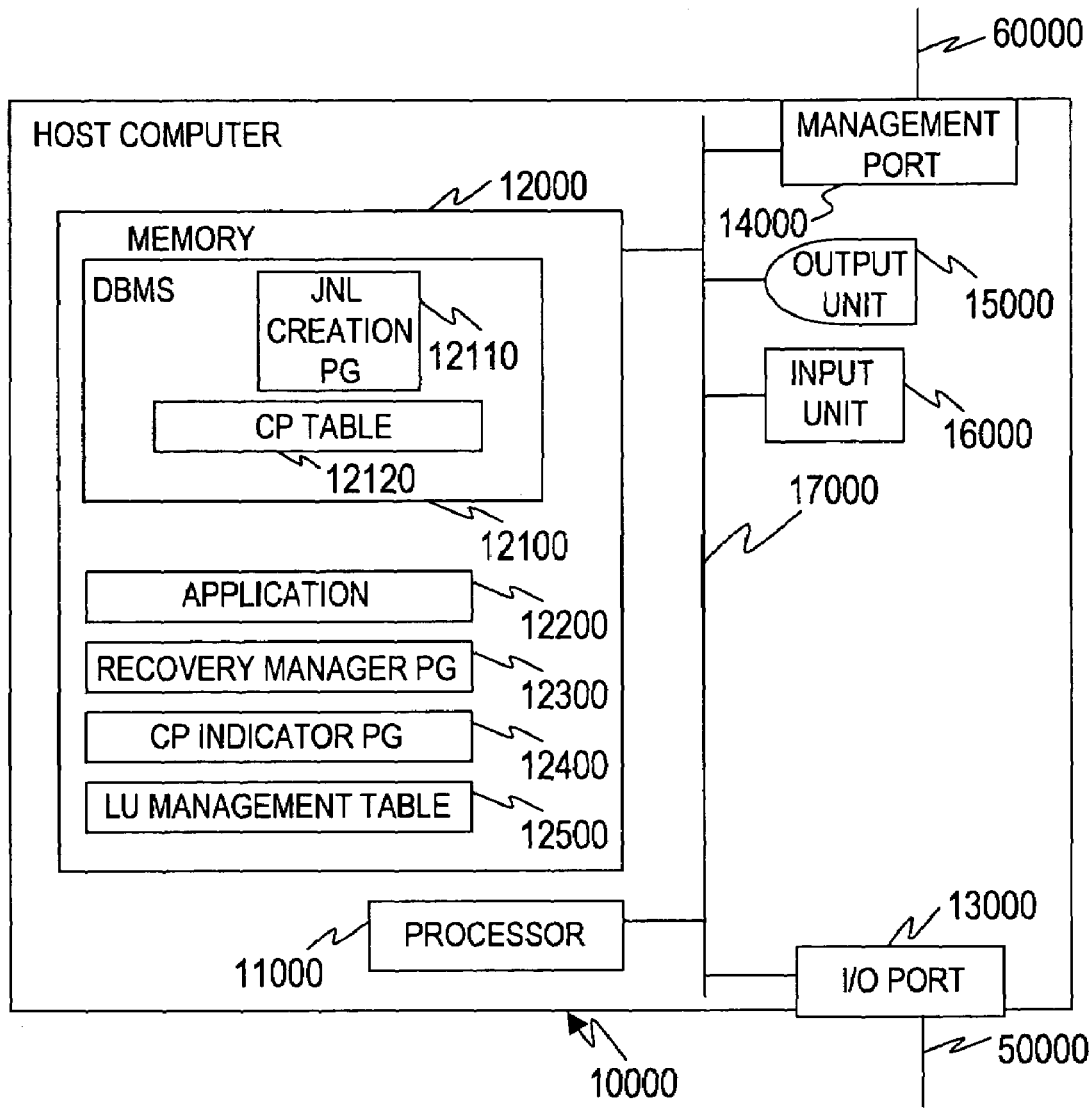
FIG. 2 is a block diagram of a host computer according to the first embodiment.

FIG. 2 is a block diagram of a host computer 10000 according to the first embodiment.

The host computer 10000 includes a processor 11000, a memory 12000, an I/O port 13000, a management port 14000, an output unit 15000, and an input unit 16000.

The processor 11000, the memory 12000, the I/O port 13000, the management port 14000, the output unit 15000, and the input unit 16000 are connected with one another via an internal bus 17000.

The I/O port 13000 is connected to the storage network 50000. Though only one I/O port 13000 is shown, there may be a plurality of I/O ports 13000. The management port 14000 is connected to the management network 60000.

The output unit 15000 is, for example, a display, on which information such as a result of processing is outputted. The input unit 16000 is a keyboard or a mouse, for example, through which information is inputted.

The processor 11000 executes programs stored in the memory 12000 to carry out various types of processing.

The memory 12000 stores programs executed by the processor 11000 and information required by the processor 11000. The memory 12000 stores an OS (not shown), a database management system (DBMS) 12100, applications 12200, a recovery manager program 12300, a CP indicator program 12400, and an LU management table 12500.

The OS controls the entire host computer 10000.

The DBMS 12100 reads/writes data from/to the storage system 20000. The DBMS 12100 includes a journal creation program (JNL creation program) 12110 and a CP table 12120.

According to this embodiment, the DBMS 12100 stores data in "LU1" of the storage system 20000. The JNL creation program 12110 of the DBMS 12100 stores JNL data of "LU1" in "LU2" of the storage system 20000.

The JNL creation program 12110 records states of a database updated by the DBMS 12100. The CP table 12120 will be described later with reference to FIG. 8. The CP table 12120 manages information on check points (CP) created according to instructions from the system administrator and the DBMS 12100.

The application 12200 cooperates with the DBMS 12100 to carry out various types of processing. According to this embodiment, the application 12200 stores data in "LU3" of the storage system 20000. The storage system 20000 stores JNL data of "LU3" in "LU5" of the storage system 20000.

The recovery manager program 12300 operates in coordination with a JNL creation program provided for the storage system. The CP indicator program 12400 instructs the storage system 20000 to create a CP.

The LU management table will be described later with reference to FIG. 7 The LU management table 12500 is information on LU's of the storage system 20000 accessed by the host computer 10000.

Figure 3:
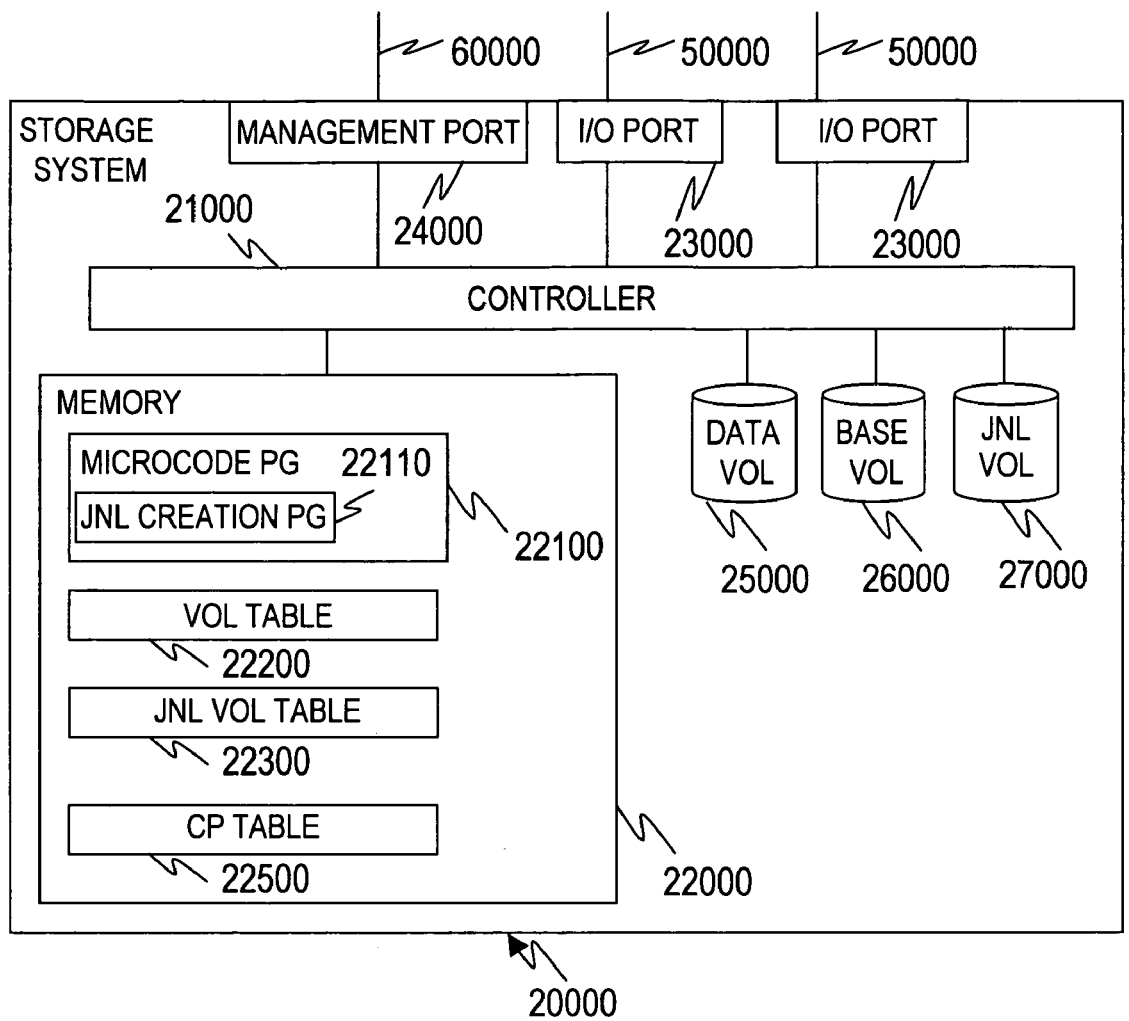
FIG. 3 is a block diagram of a storage system according to the first embodiment.

FIG. 3 is a block diagram of the storage system 20000 according to the first embodiment.

The storage system 20000 includes a controller 21000, a memory 22000, an I/O port 23000, a management port 24000, a data volume (data VOL) 25000, a base volume (base VOL) 26000, and a journal volume (JNL VOL) 27000.

The memory 22000, the I/O port 23000, the management port 24000, the data VOL 25000, the base VOL 26000, and the JNL VOL 27000 are connected with one another via the controller 21000.

The I/O port 23000 is connected to the storage network 50000. Though only one I/O port 23000 is shown, there may be a plurality of I/O ports 23000. The management port 24000 is connected to the management network 60000.

The controller 21000 executes programs stored in the memory 22000 to carry out various types of processing. The controller 21000 controls the entire storage system 20000.

The data VOL 25000 stores data to which the host computer 10000 issues a write request. The base VOL 26000 is a copy of the data VOL 25000 at the start of the creation of the JNL. The JNL VOL 27000 will be described later with reference to FIG. 4A and FIG. 4B. The JNL VOL 27000 stores JNL data.

Though only one of the data VOL 25000, the base VOL 26000, and the JNL VOL 27000 are respectively shown, there may be a plurality of them. Moreover, the data VOL 25000, the base VOL 26000, and the JNL VOL 27000 may be constituted by one hard disk, or may be constituted by a plurality of hard disks configured as a RAID. Further, the data VOL 25000, the base VOL 26000, and the JNL VOL 27000 are collectively referred to as VOL.

The memory 22000 stores a micro program 22100, a VOL table 22200, a JNL VOL table 22300, and a CP table 22500.

The micro program 22100 controls the entire storage system 20000. Moreover, the micro program 22100 includes a JNL creation program 22110.

The JNL creation program 22110 records update states of the data VOL 25000 for which JNL's are created. For example, a technology described in JP 2005-18738 A is applied to the JNL creation program 22110.

The VOL table 22200 will be described later with reference to FIG. 9. The VOL table 22200 is information on the VOL's of the storage system 20000.

The JNL VOL table 22300 will be described later with reference to FIG. 10. The JNL VOL table 22300 indicates a correspondence between the data VOL 25000 and the JNL VOL 27000. The CP table 22500 indicates information on CP's created according to instructions from the system administrator and the JNL creation program 22110. It should be noted that the JNL VOL table 22300 and the CP table 22500 are used by the JNL creation program 22110.

Figure 4A:
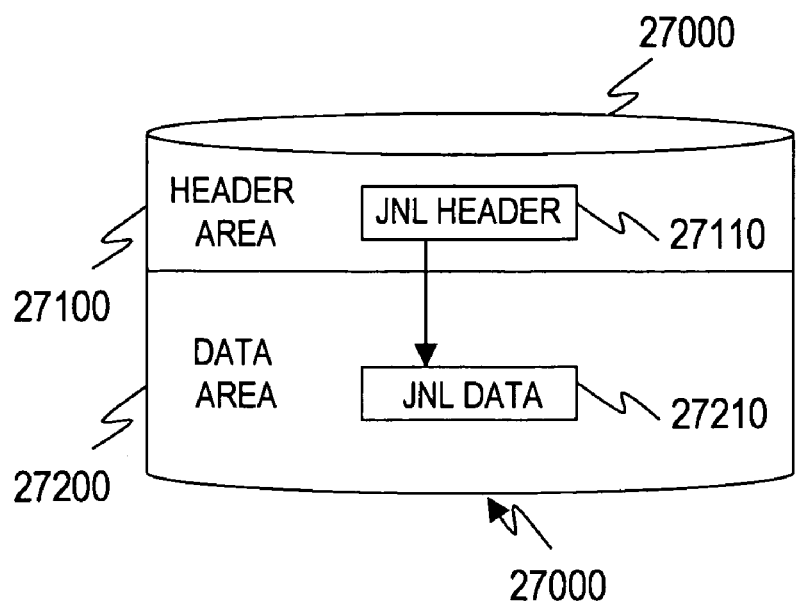
FIG. 4A is a diagram describing a JNL VOL of the storage system according to the first embodiment.

FIG. 4A describes the JNL VOL 27000 of the storage system 20000 according to the first embodiment.

The JNL VOL 27000 includes a data area 27200 and a header area 27100.

The data area 27200 stores data written to the data VOL 25000 to which JNL's are created (host-write data) as JNL data 27210. The header area 27100 stores information 27210 on the JNL data 27110 (JNL header).

Figure 4B:
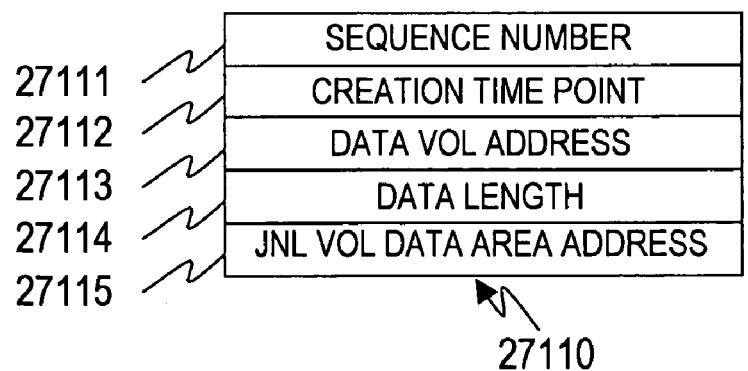
FIG. 4B is a diagram describing a JNL header according to the first embodiment.

FIG. 4B describes the JNL header 27110 according to the first embodiment.

The JNL header 27110 includes a sequence number 27111, a creation time point 27112, a data VOL address 27113, a data length 27114, and a JNL VOL data area address 27115.

The sequence number 27111 indicates an order in which the host-write data is written in the data VOL 25000. The creation time point 27112 is a time when the host-write data is written in the data VOL 25000. The VOL address 27113 is an address of the host-write data in the data VOL 25000. The data length 27114 is a data quantity of the host-write data. The JNL VOL data area address 27115 is an address of the host-write data in the JNL VOL 27000.

When host-write data is written in the data VOL 25000, the JNL creation program 22110 creates a JNL header 27110 in the header area 27100 of the JNL VOL 27000.

Then, the JNL creation program 22110 stores a sequence number 27111, a creation time point 27112, a data VOL address 27113, a data length 27114, and a JNL VOL data area address 27115 in the created JNL header 27110.

Then, the JNL creation program 22110 stores the host-write data as JNL data 27210 in a storage area starting from the stored JNL VOL data area address 27115.

Figure 5:
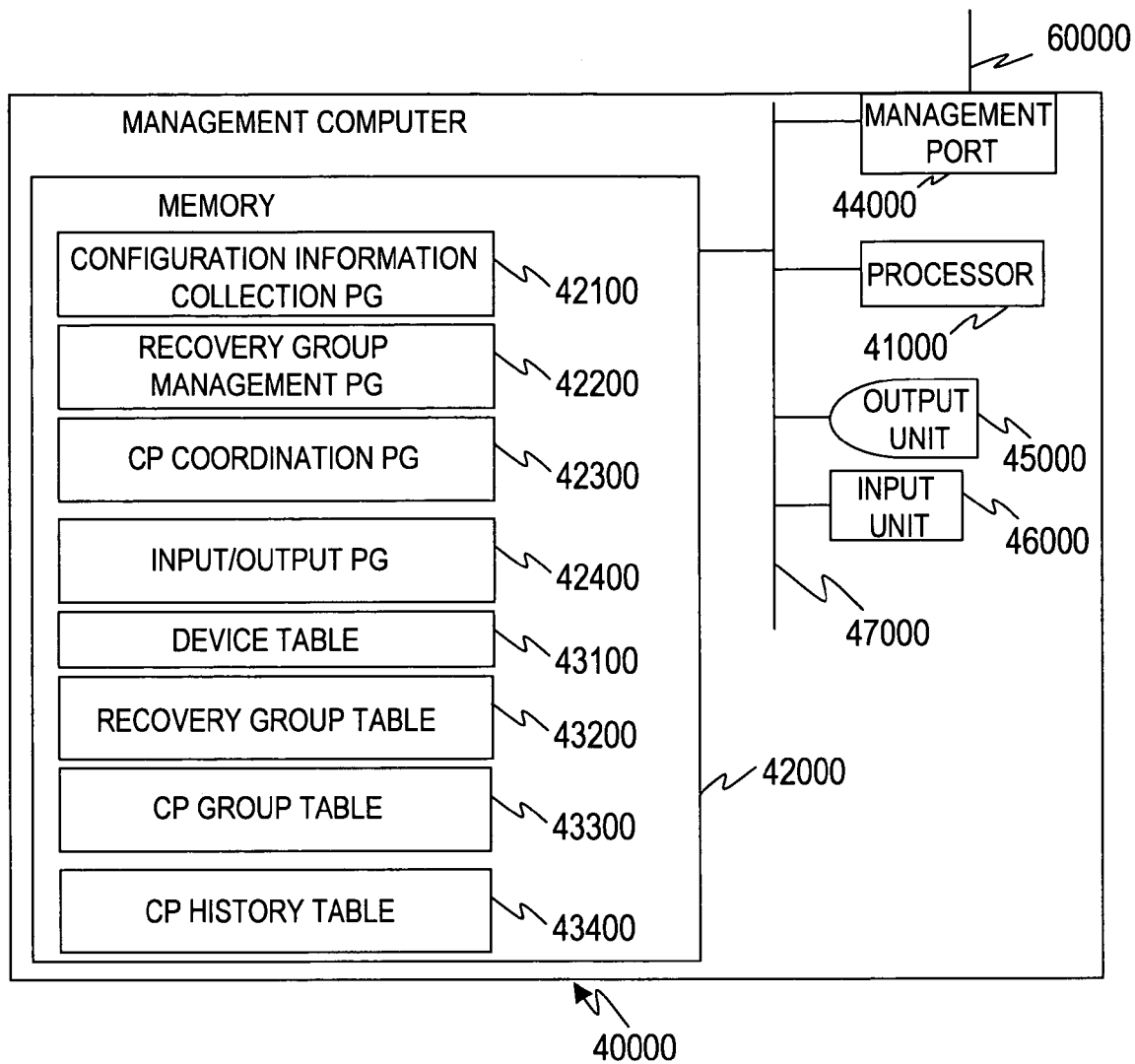
FIG. 5 is a block diagram of a management computer according to the first embodiment.

FIG. 5 is a block diagram of the management computer 40000 according to the first embodiment.

The management computer 40000 includes a processor 41000, a memory 42000, a management port 44000, an output unit 45000, and an input unit 46000.

The processor 41000, the memory 42000, the management port 44000, the output unit 45000, and the input unit 46000 are connected with one another by an internal bus 47000.

The management port 44000 is connected to the management network 60000.

The output unit 45000 is, for example, a display, on which information such as a result of processing is outputted. The input unit 46000 is, for example, a keyboard or a mouse, through which information is inputted.

The processor 41000 executes programs stored in the memory 42000 to carry out various types of processing.

The memory 42000 stores programs executed by the processor 41000 and information required by the processor 41000. The memory 42000 stores an OS (not shown), a configuration information collection program 42100, a recovery group management program 42200, a CP coordination program 42300, an input/output management program 42400, a device table 43100, a recovery group table 43200, a CP group table 43300, and a CP history table 43400.

The OS controls the entire management computer 40000. The configuration information collection program 42100 collects information on configurations of devices managed by the management computer 40000.

The recovery group management program 42200 manages LU's as a recovery group based on the recovery group table 43200.

The CP coordination program 42300 determines a CP for respective LU's belonging to a recovery group according to recovery conditions specified by the system administrator. Then, the CP coordination program 42300 carries out a recovery according to the determined CP.

The input/output program 42400 receives information from the input unit 46000. Moreover, the input/output program 42400 outputs information such as a processed result through the output unit 45000.

The device table 43100 is information on devices managed by the management computer 40000 as described later with reference to FIG. 12.

The recovery group table 43200 indicates information on recovery groups as described later with reference to FIG. 13. The recovery group table 43200 is used by the recovery group management program 42200 and the CP coordination program 42300.

A recovery group includes LU's in which data is stored by applications operating in coordination therewith. According to this embodiment, a recovery group includes LU's in which data is stored by the DBMS 12100 of the host computer 10000, and LU's in which data is stored by the application 12200 of the host computer 10000.

The recovery group table 43300 indicates information on CP groups as described later with reference to FIG. 14. The CP group table 43300 is used by the recovery group management program 42200 and the CP coordination program 42300.

It should be noted that a CP group is a set of CP's for respective LU's belonging to the recovery group.

The CP-history table 43400 manages histories of information on CP's of LU's as described later with reference to FIG. 15.

Figure 6:
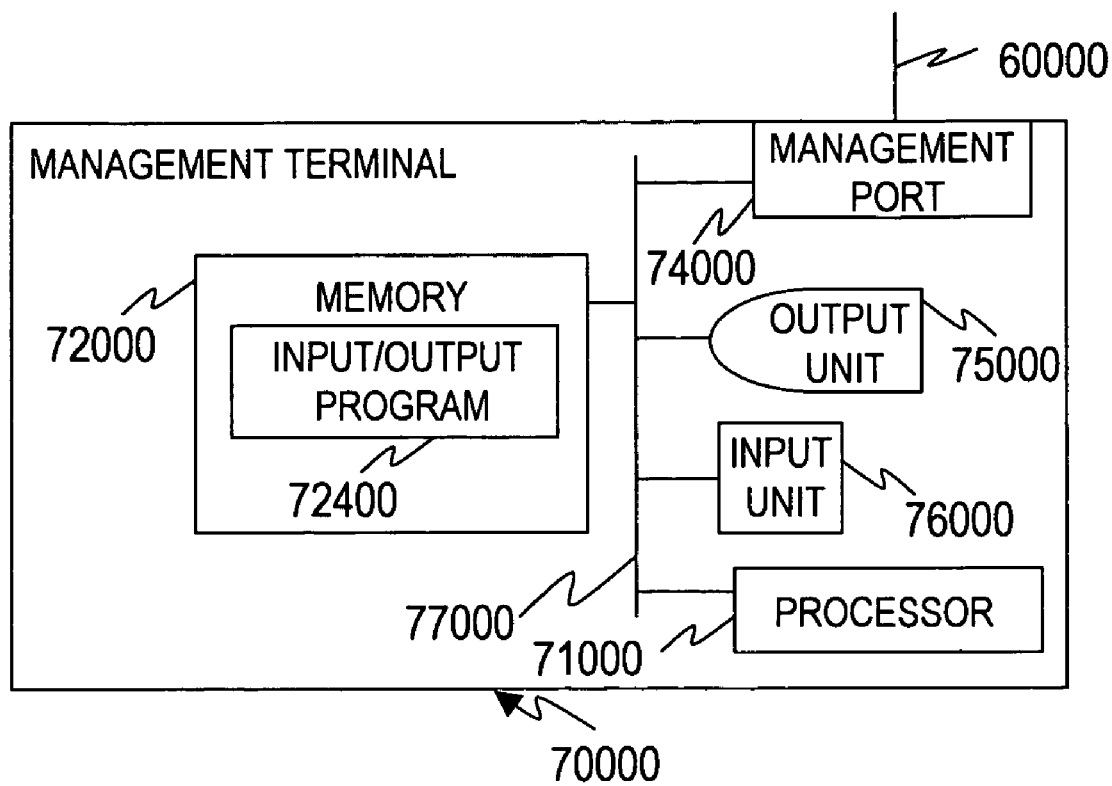
FIG. 6 is a block diagram of a management terminal according to the first embodiment.

FIG. 6 is a block diagram of the management terminal 70000 according to the first embodiment.

The management terminal 70000 includes a processor 71000, a memory 72000, a management port 74000, an output unit 75000, and an input unit 76000.

The processor 71000, the memory 72000, the management port 74000, the output unit 75000, and the input unit 76000 are connected with one another by an internal bus 77000.

The management port 74000 is connected to the management network 60000.

The output unit 75000 is, for example, a display, on which information such as a result of processing is outputted. The input unit 76000 is, for example, a keyboard or a mouse, through which information is inputted.

The processor 71000 executes programs stored in the memory 72000 to carry out various types of processing.

The memory 72000 stores programs executed by the processor 71000 and information required by the processor 71000. The memory 72000 stores an OS (not shown) and an input/output program 72400.

The OS controls the entire management terminal 70000.

The input/output program 72400 receives information from the input unit 76000. Moreover, the input/output program 72400 outputs information such as a processing result from the output unit 75000. Further, the input/output program 72400 requests the management computer 40000 to execute a program.

Figure 7:
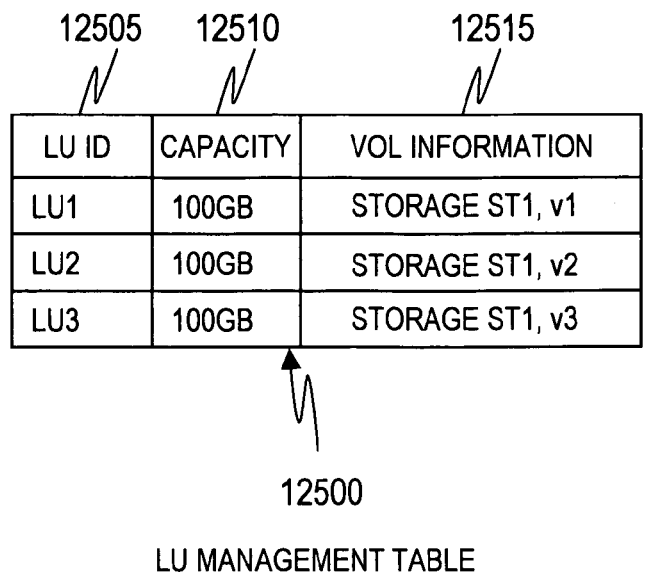
FIG. 7 is a configuration diagram of an LU management table of the host computer according to the first embodiment.

FIG. 7 is a configuration diagram of the LU management table 12500 of the host computer 10000 according to the first embodiment.

The LU management table 12500 includes an LU ID 12505, a capacity 12510, and VOL information 12515.

The LU ID 12505 is an identifier used by the host computer 10000 to uniquely identify an LU. The capacity 12510 is a storage capacity of the LU.

The VOL information 12515 is information on a VOL corresponding to the LU. Specifically, the host computer 10000 stores a value, which is obtained by issuing an Inquiry command of the SCSI to the LU, in the VOL information 12515.

Figure 8:
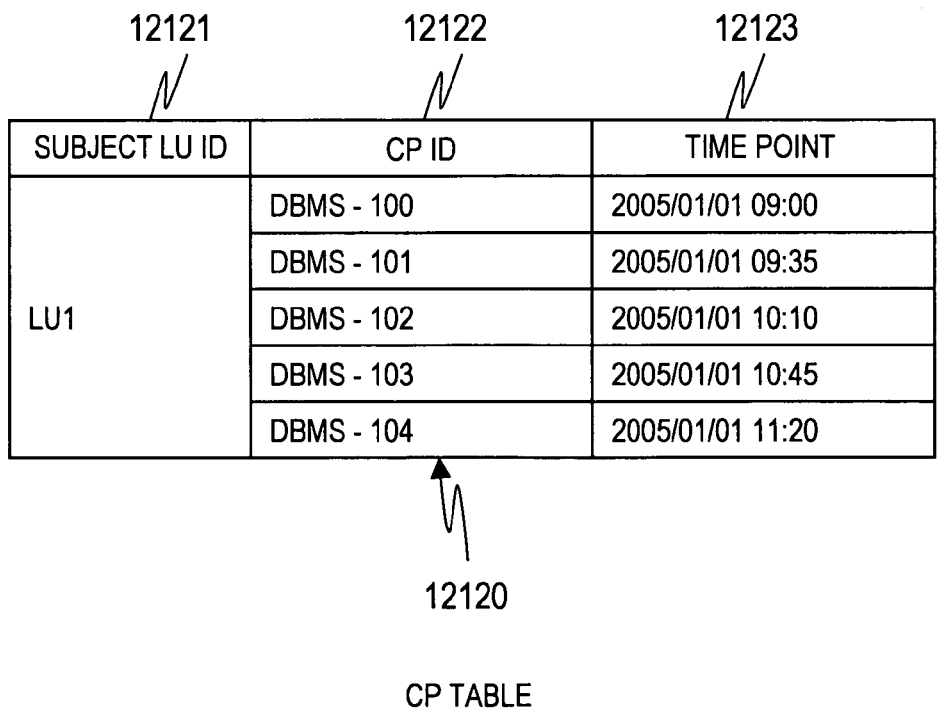
FIG. 8 is a configuration diagram of a CP table of a DBMS of the host computer according to the first embodiment.

FIG. 8 is a configuration diagram of the CP table 12120 of the DBMS 12100 of the host computer 10000 according to the first embodiment.

The CP table 12120 includes a subject LU ID 12121, a CP ID 12122, and a time point 12123.

The subject LU ID 12121 is a unique identifier of an LU corresponding to the data VOL 25000 to which the DBMS 12100 stores data. The CP ID 12122 is an identifier used by the host computer 10000 to uniquely identify a CP of the LU.

The time point 12123 is a time point at which the CP is created.

FIG. 9 is a configuration diagram of the VOL table 22200 of the storage system 20000 according to the first embodiment.

The VOL tale 22200 includes a VOL ID 22210, a host allocation 22220, and a capacity 22230.

The VOL ID 22210 is an identifier used by the storage system 20000 to uniquely identify a VOL.

The host allocation 22220 indicates whether or not the VOL is allocated to the host computer 10000. When the VOL is allocated to the host computer 10000, the host allocation 22220 stores "YES". When the VOL is not allocated to the host computer 10000, the host allocation 22220 stores "NO".

The capacity 22230 is a storage capacity of the VOL.

FIG. 10 is a configuration diagram of the JNL VOL table 22300 of the storage system 20000 according to the first embodiment.

The JNL VOL table 22300 includes a VOL group ID 22310, a data VOL ID 22320, and a JNL VOL ID 22330.

The VOL group ID 22310 is a unique identifier of a VOL group including a data VOL 25000, a base VOL 26000, and a JNL VOL 27000.

The data VOL ID 22320 is a unique identifier of the data VOL 25000 belonging to the VOL group. The JNL VOL 22330 is a unique identifier of the JNL VOL 27000 storing JNL data of the data VOL 25000.

FIG. 11 is a configuration diagram of the CP table 22500 of the storage system 20000 according to the first embodiment.

The CP table 22500 includes a VOL group ID 22510, a data VOL ID 22520, a CP ID 22530, a sequence number 22535, a base VOL ID 22540, and a time point 22550.

The VOL group ID 22510 is a unique identifier of a VOL group including the data VOL 25000, the base VOL 26000, and the JNL VOL 27000.

The data VOL ID 22520 is a unique identifier of the data VOL 25000 belonging to the VOL group.

The CP ID 22530 is an identifier used by the storage system 20000 to uniquely identify a CP of the data VOL 22520. The sequence number 22535 is a sequence number of JNL data obtained when the CP is created.

The base VOL ID 22540 is a unique identifier of a base VOL 26000 used to restore data according to the CP.

The base VOL 26000 is a copy of the data VOL 25000 at the start of the creation of the JNL's. The base VOL 26000 may be a copy of the data VOL 25000 at an arbitrary time point after the start of the creation of the JNL's.

For example, the base VOL 26000 is a copy of the data VOL 25000 obtained when a CP is created. In this case, though the storage system 20000 consumes additional resources such as a storage capacity, the RTO can be reduced. This is because the storage system 20000 does not have to trace back to the start of the creation of the JNL's to restore data.

According to the CP table 22500 of this embodiment, the storage system 20000 newly creates a base VOL 26000 whose VOL ID is "st1v31" when a CP whose CP ID 22530 is "ST1-16" is created.

As a result, when the storage system 20000 restores data using CP's whose CP ID 22530 ranges from "ST1-16" to "ST1-21", the storage system 20000 uses the base VOL 26000 corresponding to "st1v31".

The time point 22550 is a time point at which the CP is created.

Fifteen CP's are registered to the CP table 22500 according to this embodiment.

A description will be given of a CP whose CP ID 22530 is "ST1-10", for example. The CP is created at "2005/01/01 09:00". The sequence number 22535 of the JNL obtained when the CP is created is "100". The ID 22540 of the base VOL used to restore data at a time point at which the CP is created is "st1v30".

FIG. 12 is a configuration diagram of the device table 43100 of the management computer 40000 according to the first embodiment.

The device table 43100 includes a device ID 43110, a device type 43120, device information 43130, and an IP address 43140.

The device ID 43110 is a unique identifier of a device managed by the management computer 40000. The device type 43120 is a type of the device. Specifically, the device type 43120 indicates whether the device is the host computer 10000 or the storage system 20000.

The device information 43130 is information on details of the device. Specifically, the device information 43130 includes a vendor name, a model name, a serial number, and the like.

The IP address 43140 is address information used to communicate with the device.

It should be noted that the device table 43100 may be created by the system administrator in advance, or may be automatically created by a name service or the like present on the storage network 50000 or the management network 60000.

FIG. 13 is a configuration diagram of the recovery group table 43200 of the management computer 40000 according to the first embodiment.

The recovery group table 43200 includes a recovery group ID 43210, a recovery group name 43220, a subject LU 43230, a master LU 43240, CP creation 43250, CP information acquisition 43260, a recovery execution command 43270, an RPO worst value 43280, and a CP time difference 43290.

The recovery group ID 43210 is an identifier used by the management computer 40000 to uniquely identify a recovery group. The recovery group name 43220 is a name of the recovery group. The system administrator identifies a recovery group according to the recovery group name 43220.

The subject LU 43230 includes a unique identifier of an LU belonging to the recovery group, and a unique identifier of the host computer 10000 which stores data in the LU.

The master LU 43240 indicates whether the LU is a master LU or not. When the LU is a master LU, the master LU 43240 stores "X". On the other hand, when the LU is not a master LU, the master LU 43240 stores "N/A (Not Applicable)". It should be noted that a master LU is an LU selected by the system administrator from LU's belonging to a recovery group.

The CP creation 43250 includes a creation command of a CP for the LU. Moreover, the CP creation 43250 includes a creation interval of the CP of the LU.

The CP information acquisition 43260 includes an acquisition command of information on a CP of the LU. Moreover, the CP information acquisition 43260 includes an acquisition interval of the information on the CP of the LU.

The recovery execution command 43270 is a command issued when execution of a recovery of the LU is requested.

The RPO worst value 43280 and the CP time difference 43290 are set by the system administrator. The RPO worst value 43280 and the CP time difference 43290 serve as recovery conditions for the recovery group.

The RPO worst value 43280 is a permissible value of an RPO for the recovery group. It should be noted that an RPO is a difference in time between a time point when the computer system stops and a CP to which the computer system is recovered.

The CP time difference 43290 is a permissible value of a time difference between the CP's of the LU's belonging to the recovery group.

Figure 14:
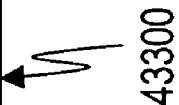
FIG. 14 is a configuration diagram of a CP group table of the management computer according to the first embodiment.

FIG. 14 is a configuration diagram of the CP group table 43300 of the management computer 40000 according to the first embodiment.

The CP group table 43300 includes a CP group ID 43310, a recovery group ID 43320, a master CP 43330, a non-master CP 43340, an RPO 43350, and a CP time difference 43360.

The CP group ID 43310 is an identifier used by the management computer 40000 to uniquely identify a CP group. The recovery group ID 43320 is a unique identifier of a recovery group which is a subject of the CP group.

The master CP 43330 is information on a CP of a master LU belonging to the CP group. Specifically, the master CP 43330 includes a unique identifier of a master LU belonging to the recovery group, and a unique identifier of the host computer 10000 to which the master LU is allocated. Moreover, the master CP 43330 includes a unique identifier of the CP of the master LU.

The non-master CP 43340 is information on a CP of a non-master LU belonging to the CP group. The non-master LU in an LU other than the master LU. Specifically, the non-master CP 43340 includes a unique identifier of the non-master LU belonging to the recovery group, and a unique identifier of the host computer 10000 to which the non-master LU is allocated. Moreover, the non-master CP 43340 includes a unique identifier of the CP of the non-master LU.

The RPO 43350 is an RPO when recovery is carried out according to the CP group. The CP time difference 43360 is a time difference between the CP's belonging to the CP group.

Figure 15:
FIG. 15 is a configuration diagram of a CP history table of the management computer according to the first embodiment.

FIG. 15 is a configuration diagram of the CP history table 43400 of the management computer 40000 according to the first embodiment.

The CP history table 43400 includes a recovery group ID 43410, an LU ID 43420, a master LU 43430, a CP ID 43440, and a time point 43450.

The recovery group ID 43410 is a unique identifier of a recovery group. The LU ID 43420 is a unique identifier of an LU belonging to the recovery group.

The master LU 43430 indicates whether the LU is a master LU or not. When the LU is a master LU, the master LU 43430 stores "X". On the other hand, when the LU is not a master LU, the master LU 43430 stores "N/A (Not Applicable)".

The CP ID 43440 is a unique identifier of a CP of the LU. The time point 43450 is a time point at which the CP is created.

A description will now be given of the computer system according to this embodiment.

First, a description will be given of a JNL creation processing performed by the JNL creation program 22110 of the storage system 20000.

The description will be given of a case where the JNL creation program 22110 of the storage system 20000 creates JNL's of the data VOL 25000 to which the host computer 10000 stores data.

The system administrator specifies the data VOL 25000 which stores data from which JNL's are created, and the JNL VOL 27000 which stores the JNL's of the data VOL 25000, in the management computer 40000. Then, the management computer 40000 updates the JNL VOL table 22300 of the storage system 20000.

Specifically, the management computer 40000 stores a unique value in the VOL group ID 22310 in the JNL VOL table 22300. Then, the management computer 40000 stores an identifier of the data VOL 25000 specified by the system administrator in the data VOL ID 22320 of the JNL VOL table 22300. Then, the management computer 40000 stores an identifier of the JNL VOL 27000 specified by the system administrator in the JNL VOL ID 22330 of the JNL VOL table 22300.

Then, the system administrator specifies an LU, and instructs the management computer 40000 to start to create JNL's. Then, the management computer 40000 requests the recovery manager program 12300 of the host computer 10000 to start to create JNL's.

Upon reception of the request from the management computer 40000, the recovery manager program 12300 requests the JNL creation program 22110 of the storage system 20000 to start to create JNL's for the data VOL 25000 for which the JNL's are to be created.

According to this embodiment, the system administrator instructs the management computer 40000 to start to create JNL's for "LU3". Upon reception of the instruction, the management computer 40000 requests the recovery manager program 12300 of the host computer 10000 to start to create JNL's for "LU3".

Then, the recovery manager program 12300 selects a record whose LU ID 12505 is "LU3" from the LU management table 12500. Then, the recovery manager program 12300 extracts, from the selected record, information of "Storage ST1, v3" stored in VOL information 12515.

Then, the recovery manager program 12300 requests the JNL creation program 22110 of the storage system 20000 corresponding to "Storage ST1" contained in the extracted information stored in the VOL information 12515 to start to create JNL's for the data VOL 25000 corresponding to "v3" contained in the extracted information stored in the VOL information 12515.

Subsequently, the JNL creation program 22110 of the storage system 20000 starts to create JNL's for the data VOL 25000.

Specifically, upon reception of a write request directed to the data VOL 25000 corresponding to "v3" from the host computer 10000, the JNL creation program 22110 stores host-write data to the data VOL 25000 corresponding to "v3". Then, the JNL creation program 22110 selects a record whose data VOL ID 22320 in the JNL VOL table 22300 matches the identifier "v3" of the data VOL 25000 from the JNL VOL table 22300. Then, the JNL creation program 22110 extracts the identifier "v5" stored in the JNL VOL ID 22330 from the selected record. Then, the JNL creation program 22110 also stores the host-write data to the JNL VOL 27000 corresponding to extracted identifier "v5".

As described above, the JNL creation program 22110 creates the JNL VOL 27000.

The storage system 20000 can restore the data VOL 25000 at an arbitrary time point after the start of the creation of the JNL's by means of the JNL VOL 27000 and the base VOL 26000.

Then, a description will now be given of creation of a CP while JNL's are being created.

The system administrator specifies an LU, and instructs the management computer 40000 to create a CP. Then, the management computer 40000 requests the recovery manager program 12300 of the host computer 10000 to create a CP.

Upon reception of the request from the management computer 40000, the recovery manager program 12300 requests the JNL creation program 22110 of the storage system 20000 to create a CP of the data VOL 25000 for which the CP is to be created.

According to this embodiment, the system administrator specifies "LU3" to which a CP is created, and instructs the management computer 40000 to create a CP. Upon reception of the instruction, the management computer 40000 requests the recovery manager program 12300 of the host computer 10000 to create a CP for "LU3".

Then, the recovery manager program 12300 selects a record whose LU ID 12505 of the LU management table 12500 matches the specified "LU3" from the LU management table 12500. Then, the recovery manager program 12300 extracts, from the selected record, information of "Storage ST1, v3" stored in the VOL information 12515.

Then, the recovery manager program 12300 requests the JNL creation program 22110 of the storage system 20000 corresponding to "Storage ST1" contained in the extracted information stored in the VOL information 12515 to create a CP for the data VOL 25000 corresponding to "v3" contained in the extracted information stored in the VOL information 12515.

Then, the JNL creation program 22110 of the storage system 20000 creates a CP for the requested data VOL 25000. Then, the JNL creation program 22110 creates a new record in the CP table 22500. Then, the JNL creation program 22110 stores information on the created CP in the new record.

Figure 16:
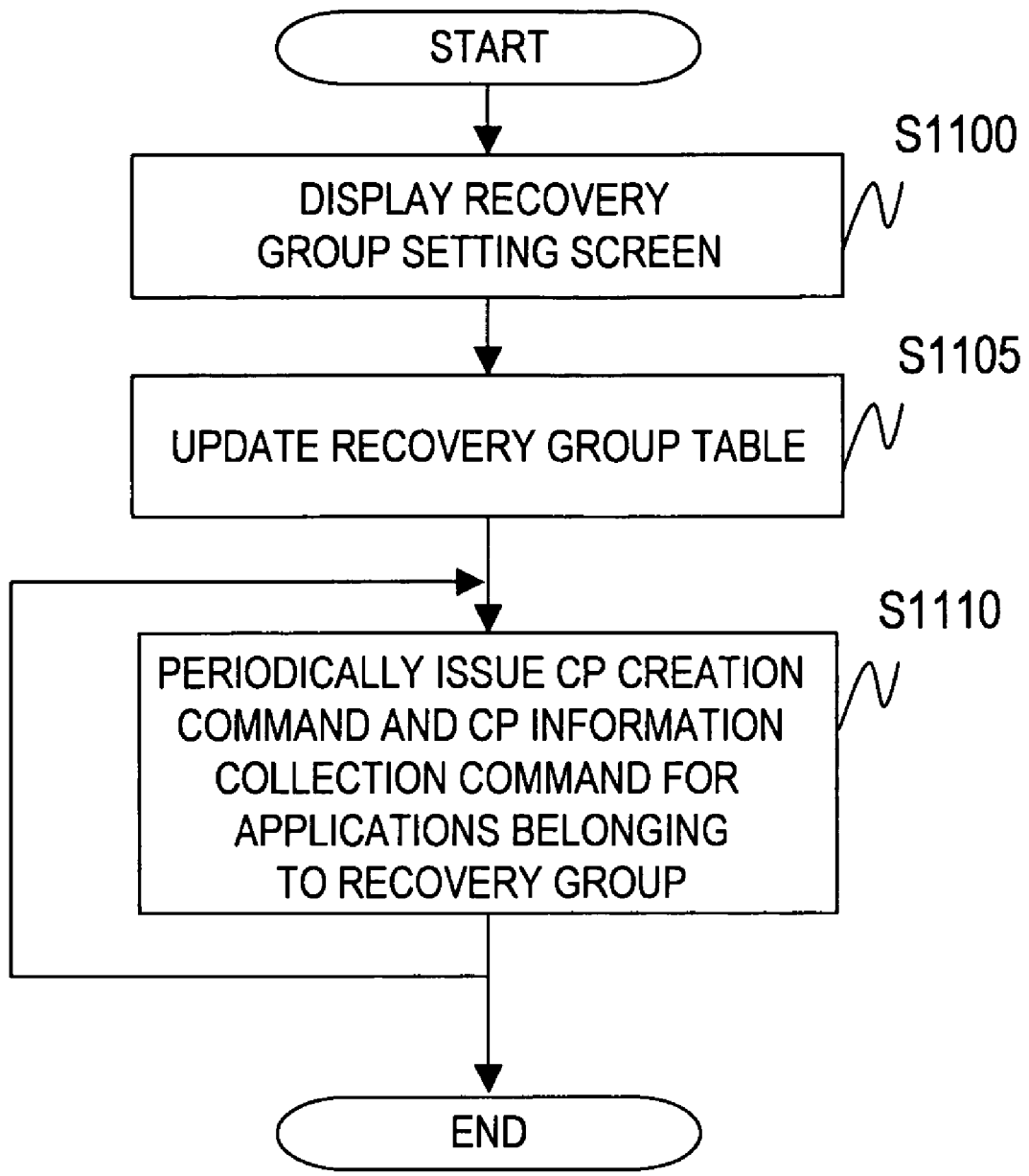
FIG. 16 is a flowchart of a recovery group setting processing by the management computer according to the first embodiment.

FIG. 16 is a flowchart of a recovery group setting processing by the management computer 40000 according to the first embodiment.

First, the management computer 40000 shows a recovery group setting screen (S1100).

Figure 17:
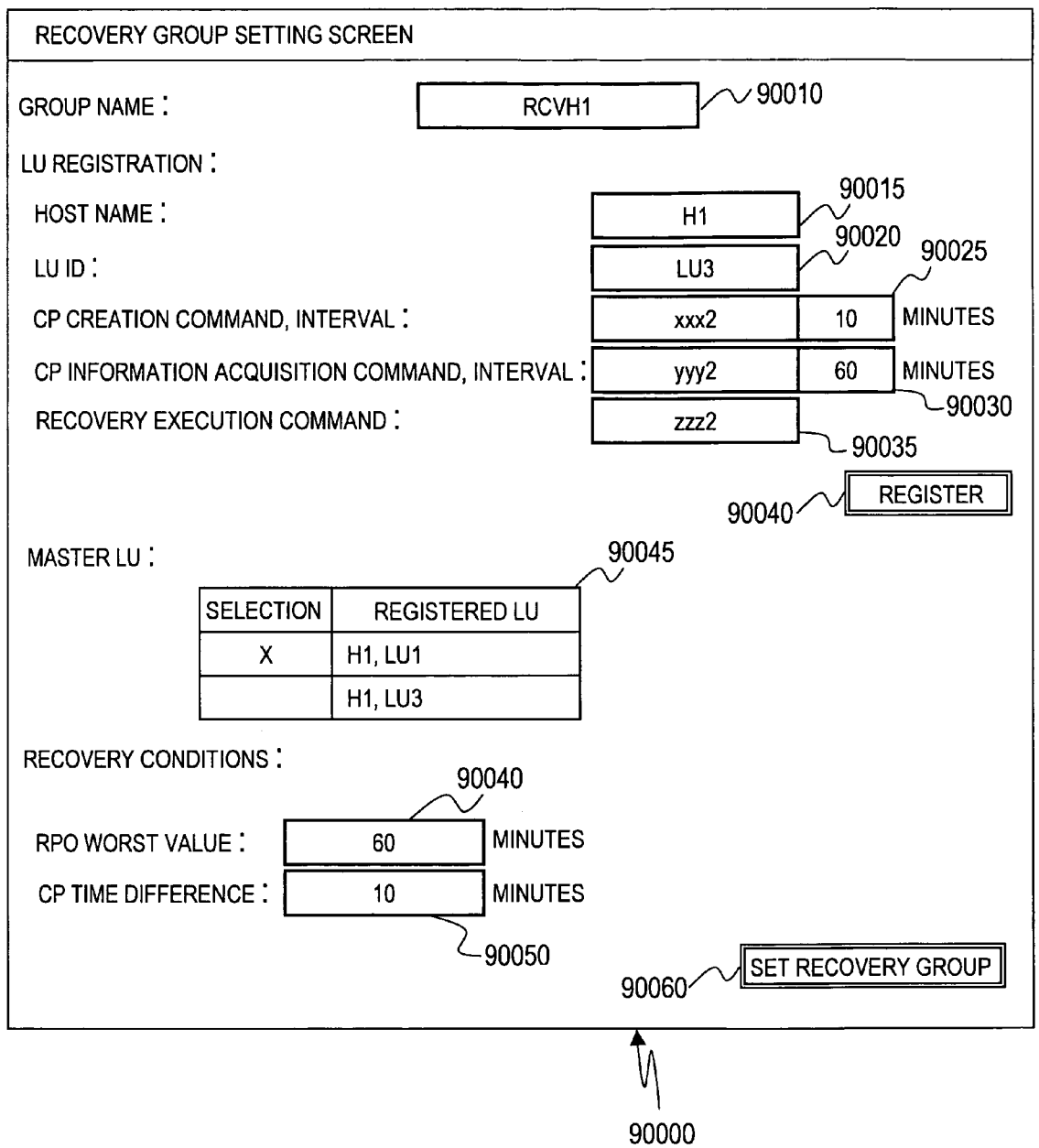
FIG. 17 describes a recovery group setting screen displayed by the management computer according to the first embodiment.

FIG. 17 describes the recovery group setting screen 90000 shown by the management computer 40000 according to the first embodiment.

The recovery group setting screen 90000 includes a recovery group name input field 90010, a host name input field 90015, an LU ID input field 90020, a CP creation command input field 90025, a CP information acquisition command field 90030, a recovery execution command input filed 90035, an LU registration button 90040, a master LU selection field 90045, an RPO worst value input field 90040, a CP time difference input field 90050, and a recovery group creation confirmation button 90060.

The system administrator inputs values in the respective fields of the recovery group setting screen 90000.

In the recovery group name input field 90010, entered is a name of a recovery group a registration of which the system administrator requests for. In the LU ID input field 90020 is entered an identifier of an LU which is caused to belong to the recovery group. In the host name 90015 is entered a unique identifier of a host computer which stores data in the LU.

In the CP creation command input field 90025, entered is a creation command of a CP of the LU. Moreover, in the CP creation command input field 90025 is entered a creation interval of the CP of the LU.

In the CP information acquisition command filed 90030, entered is an acquisition command of information on the CP of the LU. Moreover, in the CP information acquisition command input filed 90030 is entered an acquisition interval of the information on the CP of the LU.

The recovery execution command input field 90035 is entered a command issued when recovery of the LU is requested.

When the LU registration button 90040 is operated, the management computer 40000 registers the LU corresponding to the value entered in the LU ID input field 90020 to the recovery group.

Then, the management computer 40000 stores the values entered in the host name input field 90015 and the LU ID input filed 90020 in a registered LU in the master LU selection filed 90045.

It should be noted that when the LU registration button 90040 is operated, in the LU ID input field 90020, the CP creation command input filed 90025, and the CP information acquisition command input field 90030 have been stored values. When the LU registration button 90040 is operated while the rest of the input fields are empty, the management computer 40000 assumes that predetermined values are entered in these input fields.

In the master LU selection filed 90045, selected is a master LU by the system administrator. Specifically, the system administrator selects a master LU from LU's registered to the master LU selection field 90045.

In the RPO worst value input field 90040 and in the CP time difference input field 90050, entered are recovery conditions.

In the RPO worst value input field 90040, entered is a permissible value of an RPO for the recovery group. In the CP time difference input field 90050, entered is a permissible value of a time difference between CP's of the LU's belonging to the recovery group.

When the recovery setting request button 90060 is operated, the management computer 40000 updates the recovery group table 43200 based on the information entered in the recovery group setting screen 90000.

FIG. 16 will now be referred to again.

The administrator enters values in the recovery group setting screen 90000 displayed by the management computer 40000. Then, the management computer 40000 updates the recovery group table 43200 based on the values entered in the recovery group setting screen 90000 (S1105).

Specifically, the management computer 40000 stores a unique value in a recovery group ID 43210 of the recovery group table 43200. Then, the management computer 40000 stores the value entered in the recovery group input field 90010 of the recovery group setting screen 90000 in a recovery group name 43220 of the recovery group table 43200.

Then, the management computer 40000 stores the values entered in the host name input field 90015 and the LU ID input field 90020 of the recovery group setting screen 90000 in a subject LU 43230 of the recovery group table 43200.

Then, the management computer 40000 determines whether the LU is a master LU or not, based on the master LU selection field 90045 of the recovery group setting screen 90000. When the LU is a master LU, the management computer 40000 stores "X" in a master LU 43240 of the recovery group table 43200. On the other hand, when the LU is not a master LU, the management computer 40000 stores "N/A" in the master LU 43240 of the recovery group table 43200.

Then, the management computer 40000 stores the value entered in the CP creation command input field 90025 of the recovery group setting screen 90000 in a CP creation 43250 of the recovery group table 43200. Then, the management computer 40000 stores the value entered in the CP information acquisition command input field 90030 of the recovery group setting screen 90000 in a CP information acquisition 43260 of the recovery group table 43200.

Then, the management computer 40000 stores the value entered in the recovery execution command input field 90035 of the recovery group setting screen 90000 in the recovery execution command 43270 of the recovery group table 43200.

Then, the management computer 40000 stores the value entered in the RPO worst value input field 90040 of the recovery group setting screen 90000 in an RPO worst value 43280 of the recovery group table 43200. Then, the management computer 40000 stores the value entered in the CP time difference input field 90050 of the recovery group setting screen 90000 in a CP time difference 43290 of the recovery group table 43200.

As described above, the management computer 40000 updates the recovery group table 43200.

Then, the management computer 40000 periodically creates a CP for applications belonging to the recovery group, based on the recovery group table 43200. Moreover, the management computer 40000 periodically obtains information on CP's, based on the recovery group table 43200 (S1110). Then, the management computer 40000 stores the collected information in a CP history table 43400.

A description will now be given of processing by the management computer 40000 based on the recovery group table 43200 shown in FIG. 13.

The management computer 40000 creates a CP of "LU1" in every 35 minutes by issuing a CP creation command "xxx1" to "LU1". Moreover, the management computer 40000 obtains information on the CP from the CP table 12120 of the host computer 10000 in every 60 minutes by issuing a CP information acquisition command "yyy1" to "LU1". Then, the management computer 40000 stores the obtained information in the CP history table 43400.

Specifically, the management computer 40000 extracts a record, which is added after an issue of a previous CP information acquisition command, from the CP table 12120 of the host computer 10000. Then, the management computer 40000 stores a subject LU ID 12121 of the extracted record in an LU ID 43420 of the CP history table 43400.

Then, the management computer 40000 stores a CP ID 12122 of the extracted record in a CP ID 43440 of the CP history table 43400. Then, the management computer 40000 stores a time point 12123 of the extracted record in a time point 43450 of the CP history table 43400.

Then, the management computer 40000 selects a record whose subject LU 43230 in the recovery group table 43200 matches the subject LU ID 12121 of the extracted record from the recovery group table 43200. Then, the management computer 40000 extracts a master LU 43240 from the selected record. Then, the management computer 40000 stores the extracted master LU 43240 in a master LU 43430 of the CP history table 43400.

As described above, the management computer 40000 stores the information obtained from the CP table 12120 of the host computer 10000 in the CP history table 43400.

Similarly, the management computer 40000 creates a CP of "LU3" in every 10 minutes by issuing a CP creation command "xxx2" to "LU3". Moreover, the management computer 40000 obtains information on the CP from the CP table

22500 of the storage system 20000 in every 60 minutes by issuing a CP information acquisition command "yyy2" to "LU3". Then, the management computer 40000 stores the obtained information in the CP history table 43400.

Specifically, the management computer 40000 extracts a record, which is after an issue of a previous CP information acquisition command, from the CP table 22500 of the storage system 20000. Then, the management computer 40000 stores an LU ID corresponding to a data VOL ID 22520 of the extracted record in an LU ID 43420 of the CP history table 43400.

Then, the management computer 40000 stores a CP ID 22530 of the extracted record in a CP ID 43440 of the CP history table 43400. Then, the management computer 40000 stores a time point 22550 of the extracted record in a time point 43450 of the CP history table 43400.

Then, the management computer 40000 selects a record whose subject LU 43230 in the recovery group table 43200 matches an LU ID corresponding to the data VOL ID 22520 of the extracted record from the recovery group table 43200. Then, the management computer 40000 extracts a master LU 43240 from the selected record. Then, the management computer 40000 stores the extracted master LU 43240 in a master LU 43430 of the CP history table 43400.

As described above, the management computer 40000 stores the information obtained from the CP table 22500 of the storage system 20000 in the CP history table 43400.

Figure 18A:
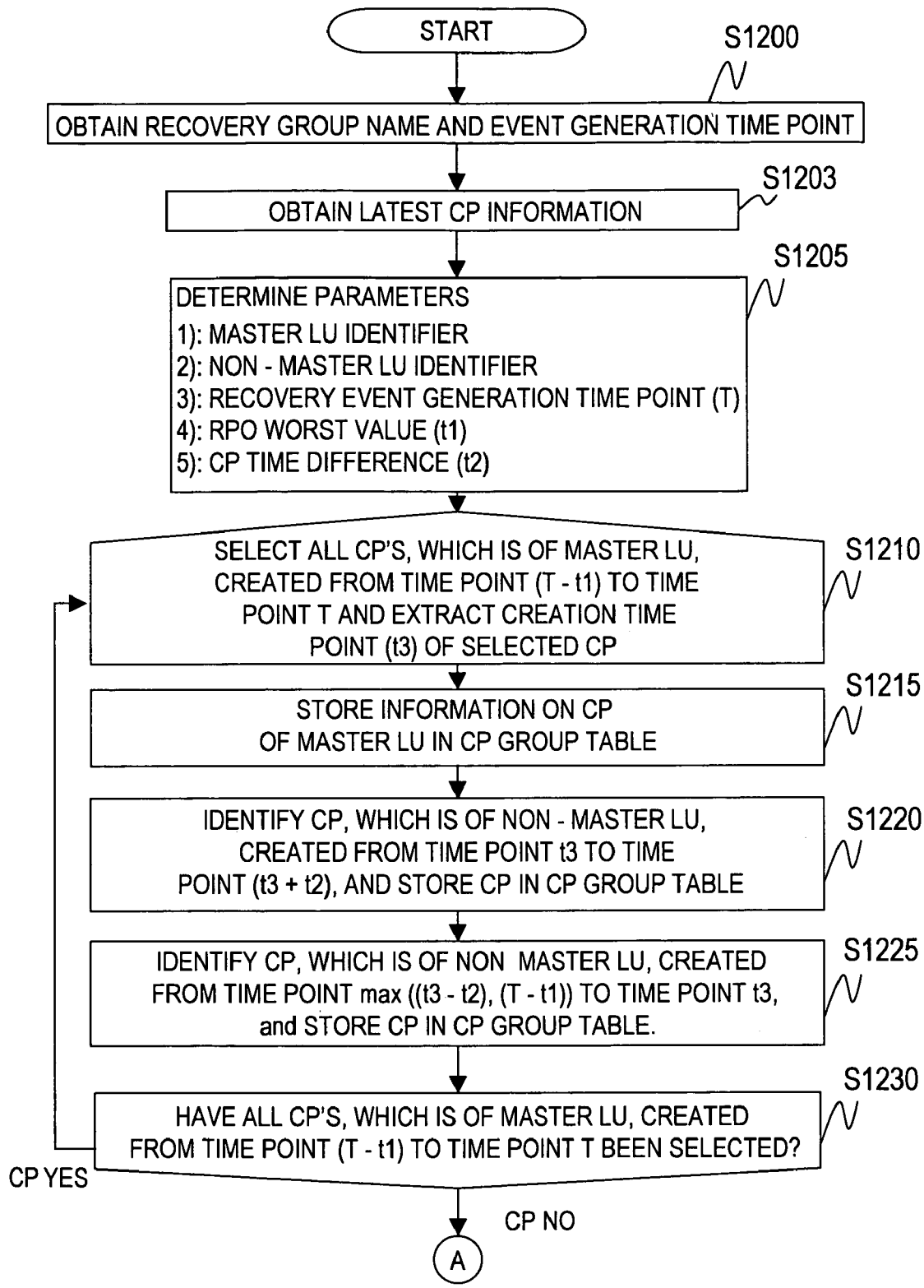
FIG. 18A is a flowchart of a processing by a CP coordination program of the management computer according to the first embodiment.
Figure 18B:
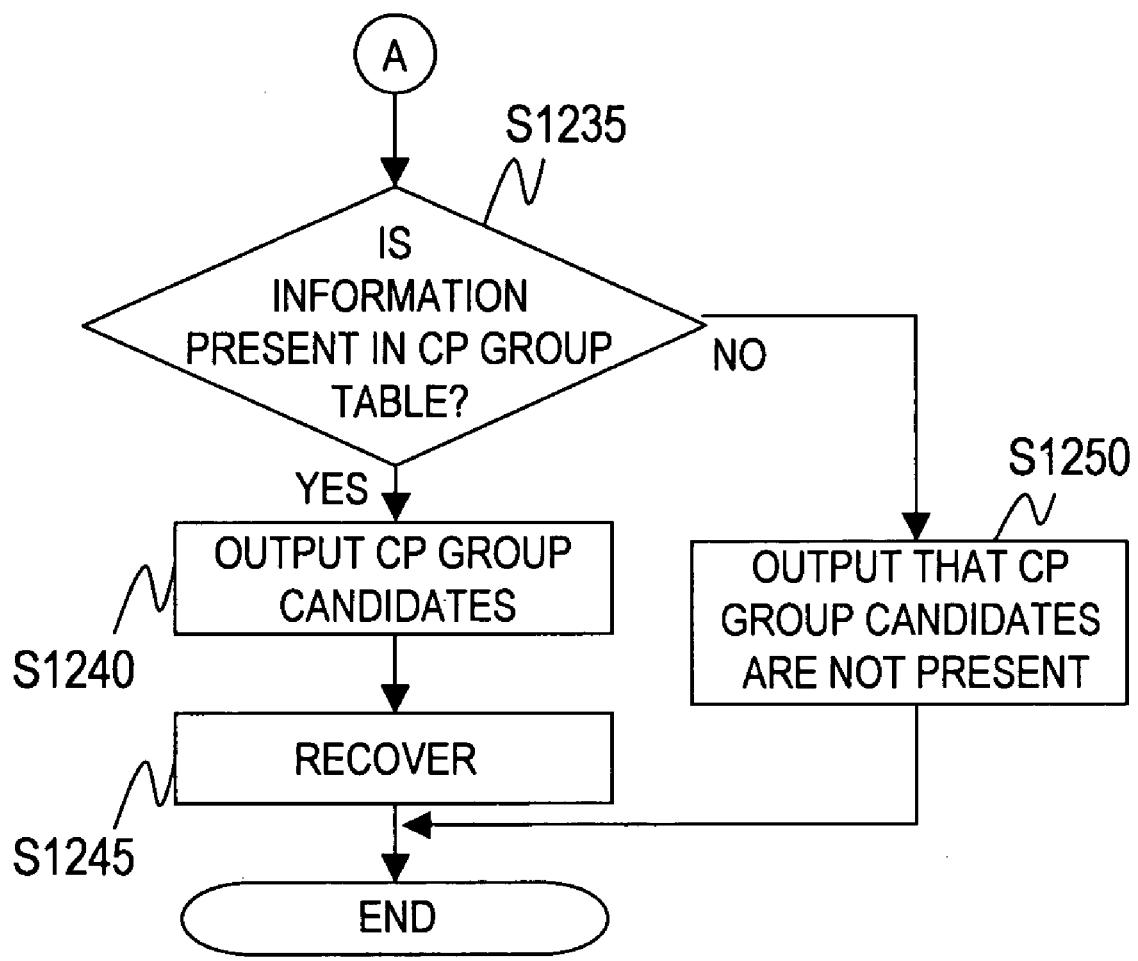
FIG. 18B is a flowchart of a continued part of the processing by the CP coordination program of the management computer according to the first embodiment.

FIG. 18A and FIG. 18B are flowcharts of the CP coordination program 42300 of the management computer 40000 according to the first embodiment.

First, the management computer 40000 displays a CP group setting screen.

Figure 19:
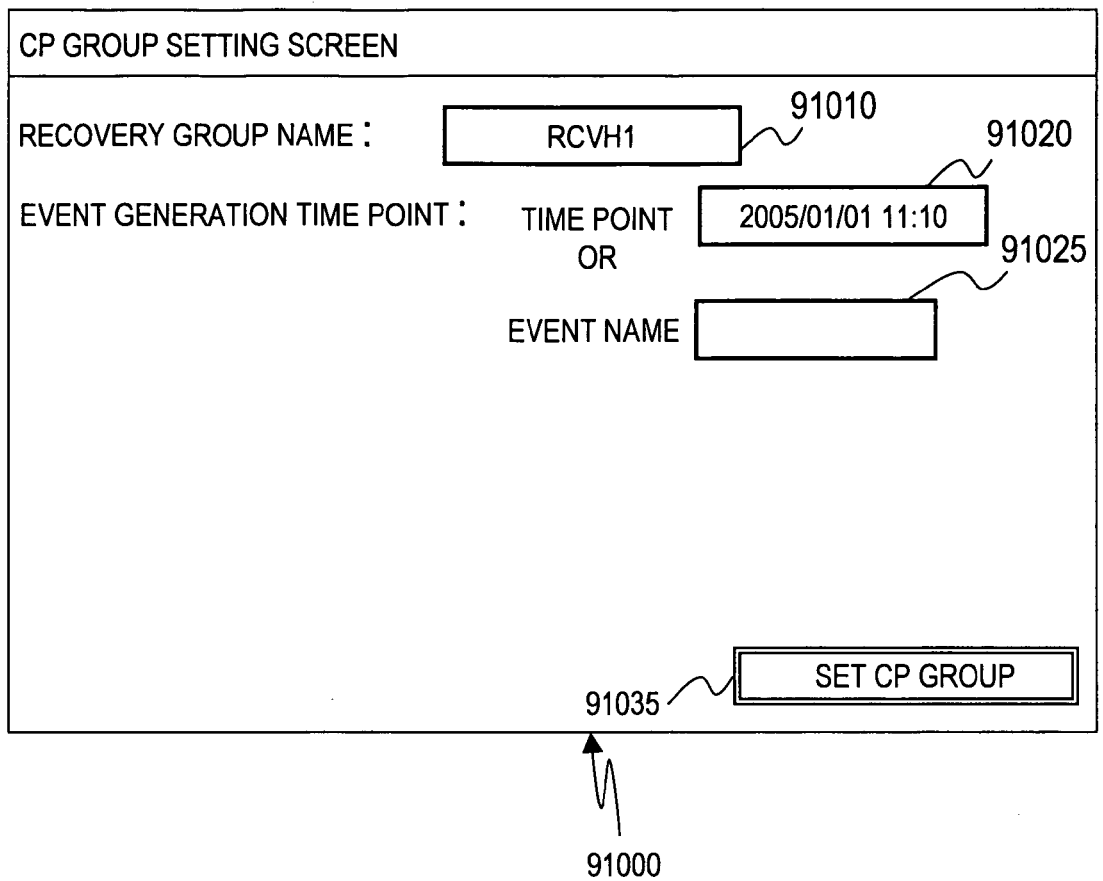
FIG. 19 describes a CP group setting screen displayed by the management computer according to the first embodiment.

FIG. 19 describes the CP group setting screen 91000 displayed by the management computer 40000 according to the first embodiment.

The CP group setting screen 91000 includes a recovery group name input field 91010, a recovery event generation time point input field 91020, an event name input field 91025, and a CP group setting button 91035.

In the recovery group name input field 91010, entered is a name of a recovery group a recovery of which is requested by the system administrator.

In the recovery event generation time point input field 91020, entered is a time point when a recovery event occurred to the recovery group. Moreover, in the event name input field 91025, entered is a name of the recovery event which occurred to the recovery group.

It should be noted that the system administrator has to enter a value in either one of the recovery event generation time point input filed 91020 or the event name input field 91025. On this diagram, "2005/01/01 11:00" is entered in the recovery event generation time point input field 91020.

When the CP group setting button 91035 is operated, the management computer 40000 carries out a recovery based on the values entered in the CP group setting screen 91000.

FIG. 18A will now be referred to again.

The management computer 40000 obtains the values entered in the displayed CP group setting screen 91000 (S 1200). Specifically, the management computer 40000 obtains the recovery group name and the event generation time point from the CP group setting screen 91000.

Then, the management computer 40000 obtains the latest information on a CP of a recovery group corresponding to the obtained recovery group name.

Specifically, the management computer 40000 selects records whose recovery group name 43220 in the recovery group table 43200 matches the obtained recovery group name from the recovery group table 43200. Then, the management computer 40000 extracts all subject LU's 43230 from the selected records.

Then, the management computer 40000 obtains information on CP's of LU's corresponding to the extracted subject LU's 43230. Then, the management computer 40000 stores the obtained information on the CP's in the CP history table 43400. It should be noted that the processing to obtain the information on CP's and the processing to store the information in the CP history table 43400 are the same as the processing described for the step S1110 of the recovery group setting processing in FIG. 16 of the management computer 40000.

Then, the management computer 40000 determines parameters used in a processing of the CP coordination program, based on the recovery group name and the recovery event generation time point obtained in the step S1200 (S1205). These parameters include an identifier of a master LU, an identifier of a non-master LU, a recovery event generation time point (T), an RPO worst value (t1), and a CP time difference (t2).

Specifically, the management computer 40000 selects records whose recovery group name 43220 in the recovery group table 43200 matches the recovery group name obtained in the step S1200 from the recovery group table 43200. Then, the management computer 40000 identifies a record whose master LU 43240 contains "X", from the selected records. Then, the management computer 40000 extracts a subject LU 43230 from the identified record. Then, the management computer 40000 designates the extracted subject LU 43230 as an identifier for the master LU, which is one of the parameters.

Then, the management computer 40000 identifies a record whose master LU 43240 contains "N/A" from the records which matches the recovery group name 43200. Then, the management computer 40000 extracts a subject LU 43230 from the identified record. Then, the management computer 40000 designates the extracted subject LU 43230 as an identifier for the non-master LU, which is one of the parameters.

Then, the management computer 40000 designates the recovery event generation time point (T) obtained in the step S1200 as one of the parameters.

Then, the management computer 40000 extracts the RPO worst value 43280 from the selected records. Then, the management computer 40000 designates the extracted RPO worst value (t1) 43280 as one of the parameters.

Then, the management computer 40000 extracts the CP time difference 43290 from the selected records. Then, the management computer 40000 designates the extracted CP time difference (t1) 43290 as one of the parameters.

As described above, the management computer 40000 refers to the recovery group table 43200 to determine the parameters. For example, the management computer determines that the identifier of the master LU is "LU1", the identifier of the non-master LU is "LU3", the recovery event generation time point (T) is "2005/01/01 11:10", the RPO worst value (t1) is "60 MINUTES", and the CP time difference (t2) is "10 MINUTES".

Then, the management computer 40000 identifies all CP's of the master LU created between a time point (T−t1) and the time point T. Then, the management computer 40000 sequentially selects all the identified CP's of the master LU. Then, the management computer 40000 extracts a creation time point (t3) of a selected CP from the CP history table 43400 (S1210). Then, the management computer 40000 carries out processing from a step S1215 to a step S1230 for the selected CP.

Specifically, the management computer 40000 selects records whose time point 43450 is between the time point (T−t1) and the time point T, from the CP history table 43400. Then, the management computer 40000 identifies all records whose LU ID 43420 in the CP history table 43400 matches the identifier of the master LU from the selected records. Then, the management computer 40000 sequentially selects the identified records. Then, the management computer 40000 extracts a CP ID 43440 and a time point (t3) 43450 from the selected record.

Then, the management computer 40000 stores information on the selected CP of the master LU in a CP group table 43200 (S1215).

Specifically, the management computer 40000 stores a unique value in a CP group ID 43310 in the CP group table 43300. Then, the management computer 40000 extracts the recovery group ID 43210 from the record selected from the recovery group table 43200 in the step S1205. Then, the management computer 40000 stores the extracted recovery group ID 43210 in a recovery group ID 43320 of the CP group table 43300.

Then, the management computer 40000 stores the identifier of the master LU in a master CP 43330 of the CP group table 43300. Further, the management computer 40000 stores the extracted CP ID 43440 extracted in the step S1210 in a master CP 43330 of the CP group table 43300.

Then, the management computer 40000 identifies a CP of the non-master LU created between the time point (t3) and a time point (t3+t2). Then, the management computer 40000 extracts a creation time point (t4) of the identified CP from the CP history table 43400. Then, the management computer 40000 stores information on the identified CP in the CP group table 43300 (S1220).

It should be noted that when the management computer 40000 identifies a plurality of CP's of the non-master LU, the management computer 40000 may store information on all the identified CP's in the CP group table 43300. Alternatively, the management computer 40000 may select one of the identified CP's, and may store information only on the selected CP in the CP group table 43300.

The CP of the non-master LU identified in the step S1220 was created after the CP of the master LU was crated.

Specifically, the management computer 40000 selects records whose time point 43450 is between the time point t3 and the time point (t3+t2) from the CP history table 43400. Then, the management computer 40000 identifies a record whose LU ID 43420 in the CP history table 43400 matches the identifier of the non-master LU, from the selected records. Then, the management computer 40000 extracts a CP ID 43440 and the time point (t4) 43450 from the identified record.

Then, the management computer 40000 stores the identifier of the non-master LU in a non-master CP 43340 of the CP group table 43300. Moreover, the management computer 40000 stores the extracted CP ID 43440 in a non-master CP 43340 of the CP group table 43300.

Then, the management computer 40000 stores a time difference (T−t3) in an RPO 43350 of the CP group table 43300. Then, the management computer 40000 stores a time difference (t4−t3) in a CP time difference 43360 of the CP group table 43300.

Then, the management computer 40000 identifies all CP's of the non-master LU created between a time point max ((t3−t2), (T−t1)) and the time point t3. It should be noted that a binary operator max (time point A, time point B) returns a later time point of the time point A and the time point B. For example, max (2005/01/01 09:00, 2005/01/01 10:00) returns 2005/01/01 10:00.

Then, the management computer 40000 extracts a creation time point (t5) of the identified CP from the CP history table 43400. Then, the management computer 40000 stores information on the identified CP in the CP group table 43300 (S1225).

When the management computer 40000 identifies a plurality of CP's of the non-master LU, the management computer 40000 may store information on all the identified CP's in the CP group table 43300. Alternatively, the management computer 40000 may select one of the identified CP's, and may store information only on the selected CP in the CP group table 43300.

The CP of the non-master LU identified in the step S1225 was created before the CP of the master LU was crated.

Specifically, the management computer 40000 selects records whose time point 43450 in the CP history table 43400 is between a time point max ((t3−t2), (T−t1)) and the time point t3 from the CP history table 43400. Then, the management computer 40000 identifies a record whose LU ID 43420 in the CP history table 43400 matches the identifier of the non-master LU, from the selected records. Then, the management computer 40000 extracts a CP ID 43440 and the time point (t5) 43450 from the identified record.

Then, the management computer 40000 stores the identifier of the non-master LU in a non-master CP 43340 of the CP group table 43300. Moreover, the management computer 40000 stores the extracted CP ID 43440 in a non-master CP 43340 of the CP group table 43300.

Then, the management computer 40000 stores the time difference (T−t5) in an RPO 43350 of the CP group table 43300. Then, the management computer 40000 stores a time difference (t3−t5) in a CP time difference 43360 of the CP group table 43300.

Then, the management computer 40000 determines whether all the CP's of the master LU created between the time point (T−t1) and the time point T have been selected in the step S1210 (S1230).

When the CP's of the master LU has not completely selected, the management computer 40000 returns its processing to the step S1210. Then, the management computer 40000 repeats the processing in the step S1210 to the step S1230 for the CP of the master LU which has not been selected.

On the other hand, when all the CP's of the master LU has been selected, the management computer 40000 determines whether information is stored in the CP table 43300 (S1235).

When information is not stored in the CP group table 43300, the management computer 40000 determines that there is no CP group which satisfies the recovery conditions. The recovery conditions include the recovery event generation time point, the RPO worst value, and the CP time difference. Thus, the management computer 40000 displays that there is no candidate for the CP group (S 1250). Then, this processing is finished.

On this occasion, the management computer 40000 may change the recovery conditions, and may execute this processing again.

On the other hand, when the CP group table 43300 contains information, the management computer 40000 creates a CP group candidate selection screen based on the CP group table 43300. Then, the management computer 40000 displays the created CP group candidate selection screen.

FIG. 20 describes the CP group candidate selection screen 92000 displayed by the management computer 40000 according to the first embodiment.

The CP group candidate selection screen 92000 includes a recovery group name 92010, a master LU ID 92020, a recovery event generation time point 92030, a CP group table 43300, and a CP group selection field 92041, and a recovery execution button 92050.

The recovery group name 92010 is a name of a recovery group. The system administrator uniquely identifies a recovery group according to the recovery group name 92010.

The management computer 40000 selects records whose recovery group ID 43210 of the recovery table 43200 matches the recovery group ID 43320 of the CP group table 43300, from the recovery group table 43200. Then, the management computer 40000 extracts the recovery group name 43320 from the selected records. Then, the management computer 40000 displays the extracted recovery group name 43320 as the recovery group name 92010 of the CP group candidate selection screen 92000.

The master LU ID 92020 is a unique identifier of a master LU of the recovery group.

The management computer 40000 extracts the master LU ID from the master CP 43330 of the CP group table 43300. Then, the management computer 40000 displays the extracted master LU ID as the master LU ID 92020 in the CP group candidate selection screen 92000.

The recovery event generation time point 92030 is a time point when the recovery event occurs to the recovery group.

The management computer 40000 displays the recovery event generation time point obtained in the step S1200 as the recovery event generation time point 92030 in the CP group candidate selection screen 92000.

The management computer 40000 shows the CP group table 43300 partially or entirely in the CP group candidate selection screen 92000. In FIG. 20, the management computer 40000 shows the master CP's 43330, the non-master CP's 43340, the RPO's 43350, and the CP time differences 43360 of the CP group table 43300.

In the CP group selection filed 92041, the system administrator selects a CP group. Specifically, the system administrator selects a CP group to be used for a recovery from the CP candidate groups stored in the CP group table 43300.

When the recovery execution button 92050 is operated, the management computer 40000 uses the CP group selected in the CP group selection field 92041 to carry out the recovery.

FIG. 18B will now be referred to again.

The system administrator specifies the CP group to request the management computer 40000 to execute recovery. Then, the management computer 40000 uses the specified CP group to recover data (S 1245).

Specifically, the management computer 40000 obtains the identifier of the CP group selected in the CP group candidate selection screen 92000. Then, the management computer 40000 selects a record whose CP group ID 43310 of the CP group table 43300 matches the obtained identifier of the CP group from the CP group table 43300. Then, the management computer 40000 extracts a master CP 43330 and a non-master CP 43340 from the selected record.

Then, the management computer 40000 selects a record whose subject LU 43230 of the recovery table 43200 matches a master LU ID included in the extracted master CP 43330, from the recovery group table 43200. Then, the management computer 40000 extracts a recovery execution command 43270 from the selected record.

Then, the management computer 40000 transmits the extracted recovery execution command 43270 to the JNL creation program 22100 of the storage system 20000. On this occasion, the management computer 40000 notifies the JNL creation program 22110 of the storage system 20000 of a CP ID contained in the extracted master CP 43330.

Then, the JNL creation program 22-110 uses JNL data to recover the master LU.

Specifically, the JNL creation program 22110 selects a record whose CP ID 22530 of the CP table 22500 matches the notified CP ID from the CP table 22500. Then, the JNL creation program 22110 extracts a sequence number (num1) 22535 and a base VOL ID 22540 from the selected record. Then, the JNL creation program 22110 selects a record relating to a CP at which a VOL corresponding the extracted VOL ID 22540 (base vol) was created, from the CP table 22500, by tracing back the records in the CP table 22500. Then, the JNL creation program 22110 extracts a sequence number (num2) 22535 from the selected record.

Then, the JNL creation program 22110 overwrites JNL data from num1 to num 2 to the base vol. In this way, the JNL creation program 22110 recovers the master LU.

Similarly, the management computer 40000 selects a record whose subject LU 43230 of the recovery table 43200 matches a non-master LU ID included in the extracted non-master CP 43340 from the recovery group table 43200. Then, the management computer 40000 extracts a recovery execution command 43270 from the selected record.

Then, the management computer 40000 issues the extracted recovery execution command 43270. On this occasion, the management computer 40000 notifies the JNL creation program 22110 of the storage system 20000 of a CP ID contained in the extracted non-master CP 43340.

Then, the JNL creation program 22110 uses JNL data to recover the non-master LU.

Then, the management computer 40000 completes this process.

According to this embodiment, the management computer 40000 can display candidates of CP groups when the system administrator specifies a recovery event time point. With this configuration, the system administrator can omit an operation of selecting CP's for respective applications. As a result, the RTO can be reduced.

It should be noted that, in the step S1240, the management computer 40000 may select a CP group to be used for a recovery by itself, instead of outputting recovery candidates. For example, the management computer 40000 selects a CP group having the smallest CP time difference 43360 from the CP group table 43300. As a result, a load on the system administrator can be further reduced owing to the management computer 40000.

A description will now be given of a variation of the host computer 10000.

Figure 21:
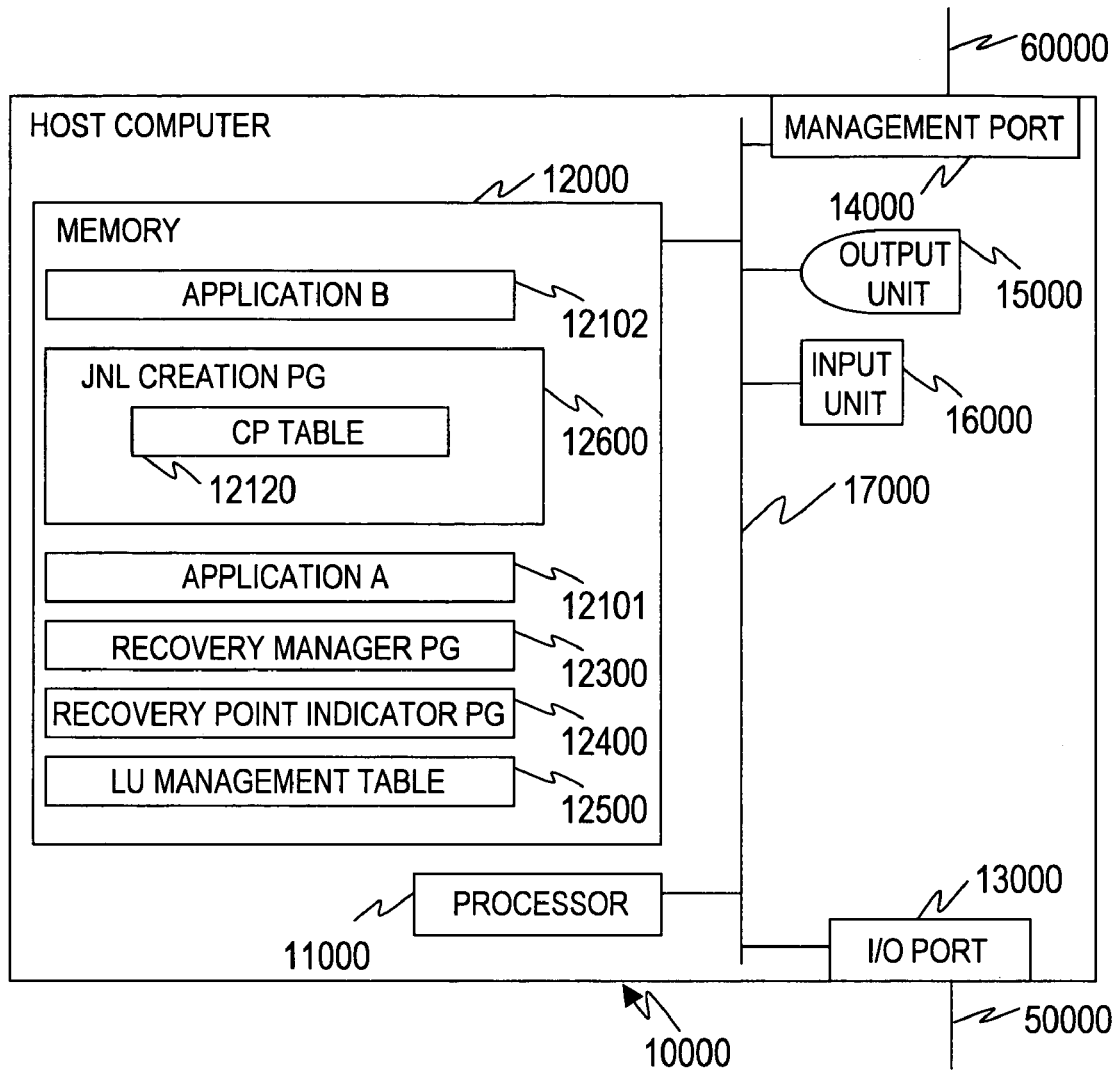
FIG. 21 is a block diagram of a variation of the host computer according to the first embodiment.
Figure 22:
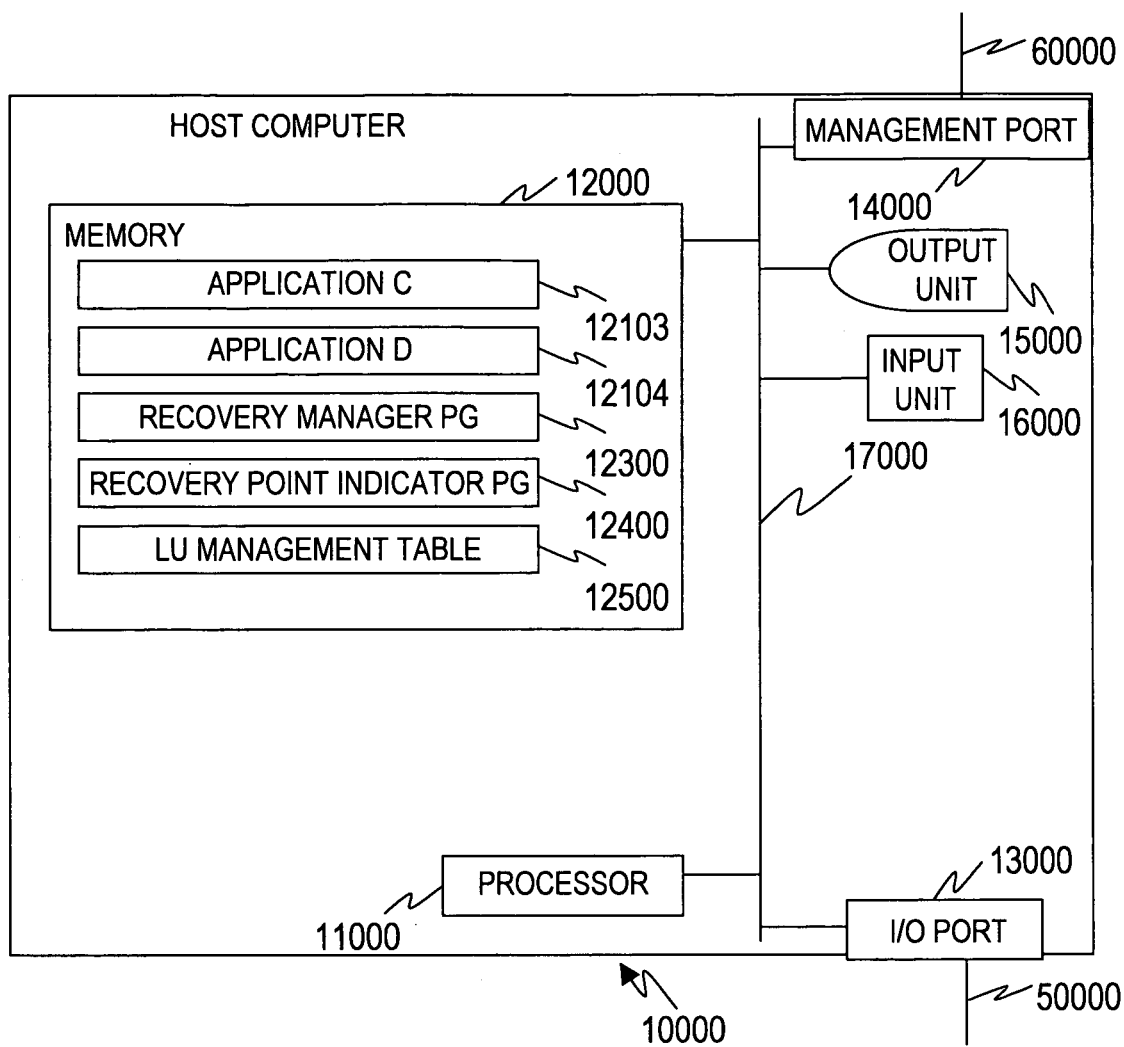
FIG. 22 is a block diagram of a variation of the host computer according to the first embodiment.

The computer system according to this embodiment may include a host computer 10000 shown in FIG. 21 or FIG. 22 in place of the host computer 10000 shown in FIG. 2.

FIG. 21 is a block diagram of a variation of the host computer 10000 according to the first embodiment.

The host computer 10000 in this block diagram includes a JNL creation program 12600, an application A12101, and an application B12102. The other configuration of the host computer in this block diagram is the same as that of the host computer 10000 in FIG. 2. Like components are denoted by like numerals as of the configuration in FIG. 2, and will be explained in no more details.

The JNL creation program 12600 is different from the JNL creation program 12110 of the host computer 10000 shown in FIG. 2, and is an independent program. Moreover, the JNL creation program 12600 records update states of the data VOL 25000 by the application B 12102. Further, the JNL creation program 12600 includes a CP table 12120.

The application A 12101 and the application B 12102 store data in the data VOL 25000 of the storage system 20000. It should be noted that update states of the data VOL 25000 by the application A12101 are recorded by the JNL creation program 22110 of the storage system 20000. On the other hand, the update states of the data VOL 25000 by the application B12102 are recorded by the JNL creation program 12110 of the host computer 10000.

In this case, the JNL creation program 12600 of the host computer 10000 creates a CP of the application B12102. Then, the JNL creation program 12600 stores information on the created CP in the CP table 12120. Then, the management computer 40000 periodically obtains information on CP's of the application B12102 from the CP table 12120 of the JNL creation program 12600.

The other processings of the computer system including the host computer in this diagram are the same as those of the computer system including the management computer shown in FIG. 2, and a description thereof, therefore, is omitted.

FIG. 22 is a block diagram of a variation of the host computer 10000 according to the first embodiment.

The host computer 10000 in this block diagram includes an application C12103, and an application D12104, and does not includes a JNL creation program. The other configuration of the host computer 10000 in this diagram is the same as that of the host computer 10000 in FIG. 2. Like components are denoted by like numerals as of the configuration in FIG. 2, and will be explained in no more details.

The application C12103 and the application D12104 store data in the data VOL 25000 of the storage system 20000. It should be noted that update states of the data VOL 25000 by the application C12103 and the application D12104 are recorded by the JNL creation program 22110 of the storage system 20000.

On this occasion, the JNL creation program 22110 of the storage system 20000 creates CP's of the application C12103 and the application D 12104. Then, the JNL creation program 22110 stores information on the created CP's in the CP table 22500 of the storage system 20000. Then, the management computer 40000 periodically obtains information on CP's of the application C12103 and the application D12104 from the CP table 22500 of the storage system 20000.

The other processings of the computer system including the host computer 10000 in this diagram are the same as those of the computer system including the host computer shown in FIG. 2, and a description thereof, therefore, is omitted.

As described above, in the computer system according to this embodiment, the JNL creation program may be executed by the host computer 10000 or the storage system 20000.

Moreover, the computer system according to this embodiment may include a unit for synchronizing the time.

For example, the host computer 10000, the storage system 20000, and the management computer 40000 may include a time synchronization program.

The time synchronization program uses the NTP protocol specified in RFC 1059 "Network Time Protocol (Version 1) Specification and Implementation" created by the IETE (Internet Engineering Task Force) to synchronize timers in a computer system.

With this configuration, the management computer 40000 can calculate a time difference of a CP with high precision for respective applications.

Second Embodiment

According to a second embodiment, the system administrator specifies an event name instead of a recovery event generation time point.

A computer system according to the second embodiment is the same as the computer system according to the first embodiment in FIG. 1 except for a configuration of the host computer 10000 and the management computer 40000. A description of the configuration other than that of the host computer 10000 and the management system 40000 therefore is omitted.

Figure 23:
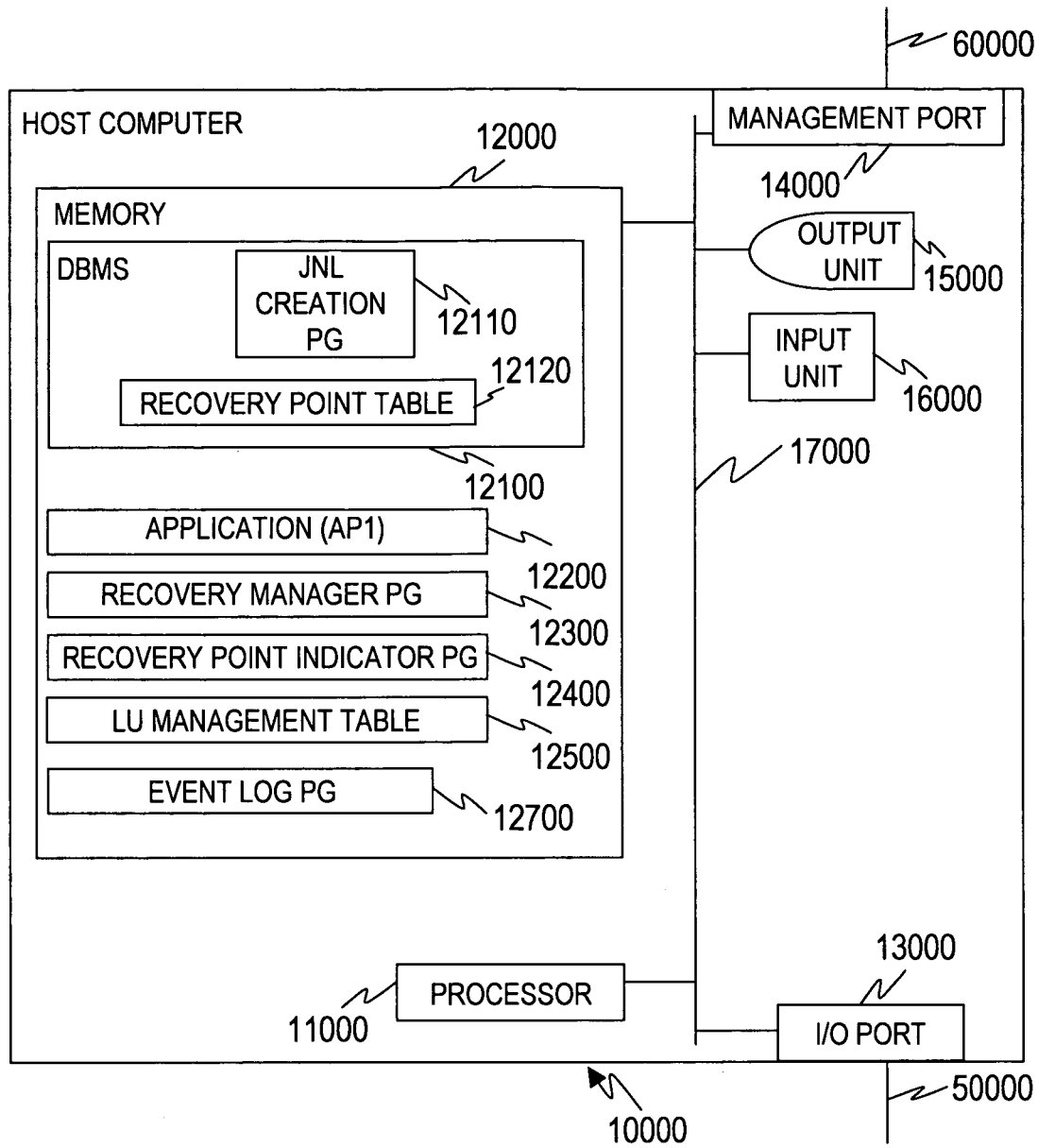
FIG. 23 is a block diagram of a host computer according to a second embodiment.

FIG. 23 is a block diagram of the host computer 10000 according to the second embodiment.

The host computer 10000 according to the second embodiment stores an event program 12700 in the memory 12000. The other configuration of the host computer 10000 according to the second embodiment is the same as that of the host computer according to the first embodiment in FIG. 2. Like components are denoted by like numerals as of the configuration in FIG. 2, and will be explained in no more details.

The event program 12700 records events occurring on the host computer 10000.

It should be noted that the event program 12700 may be a control program of output logs which is commonly provided for the OS (not shown) of the host computer 10000. For example, when the UNIX operating system is running on the host computer 10000, the event program 12700 may be a program which outputs a login history of a user created when the login command is processed, or a program which outputs a log on a system failure by means of the syslog program. Moreover, the event program 127000 may be a program such as an anti-virus program which controls logs output from a specific application.

Figure 24:
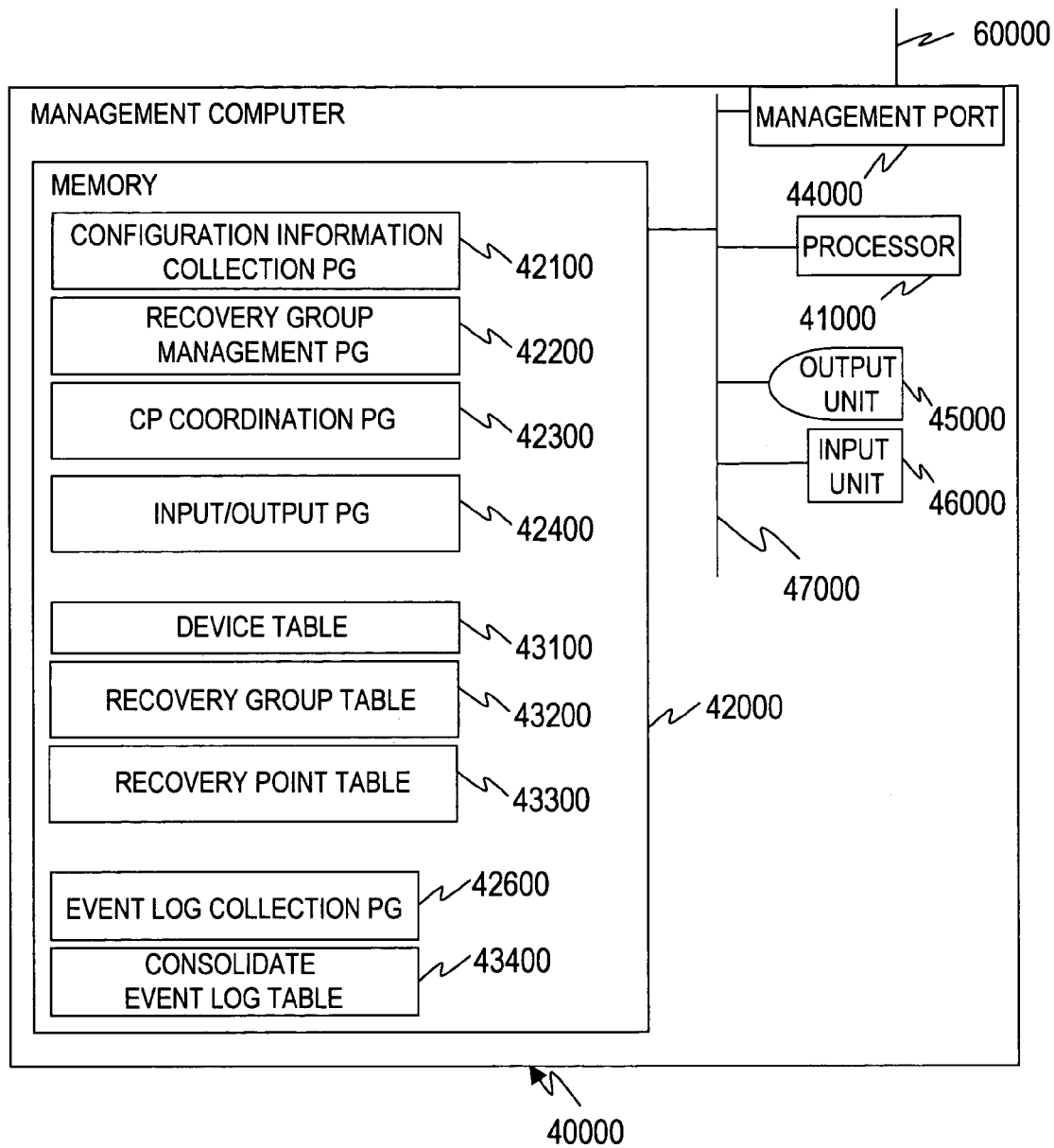
FIG. 24 is a block diagram of a management computer according to the second embodiment.

FIG. 24 is a block diagram of the management computer 40000 according to the second embodiment.

The management computer 40000 according to the second embodiment stores an event log collection program 42600 and a consolidated event log table 43500 in the memory 42000. The other configuration of the host computer 40000 according to the second embodiment is the same as that of the management computer according to the first embodiment in FIG. 5. Like components are denoted by like numerals as of the configuration in FIG. 5, and will be explained in no more details.

The event log collection program 42600 collects logs of events generated in the host computer 10000, and stores the collected logs in the consolidated event log table 43500.

It should be noted that the event log collection program 42600 may be a program which periodically collects logs output by an log output control program of the OS (not shown) of the host computer 10000.

For example, when the UNIX operating system is running on the host computer 10000, the host computer 426000 stores login histories of users created on the login command being processed, in a log file. Thus, the event log collection program 42600 periodically collects the login histories stored in the log file. Moreover, the syslog program has a function of forwarding a log file to other computers. Thus, the event log collection program 42600 uses the forward function of the syslog program to thereby periodically be able to collect event logs by the syslog program.

Moreover, in a case of collecting logs created by a program which control logs output by specific applications, the event log collection program 42600 periodically collects log files set by respective applications.

When a collected log file is a binary format, the event log collection program 42600 converts the log file into a text format.

The consolidated event log table 43500 manages logs of events which occur in the host computer 10000 as described later with reference to FIG. 25.

FIG. 25 is a configuration diagram of the consolidated event log table 43500 of the management computer 40000 according to the second embodiment.

The consolidated event log table 43500 includes a log ID 43510, a time point 43520, and a log description 43530.

The log ID 43510 is a unique identifier of a log of an event which has occurred in the host computer 10000. The time point 43250 is a creation time point of the log. Namely, the time point 43520 is a time point when the event corresponding to the log occurred. The log description 43530 is a description of the event corresponding to the log.

The processing by the second computer system is the same as that of the first embodiment except for the step S1200 in the processing according to the CP coordination program 42300 of the management computer 40000 (FIG. 18A and FIG. 18B). It should be noted that a description of the same processing is omitted.

The management computer 40000 displays a CP group setting screen 91000 in the step S1200 of the processing according to the CP coordination program 42300.

Figure 26:
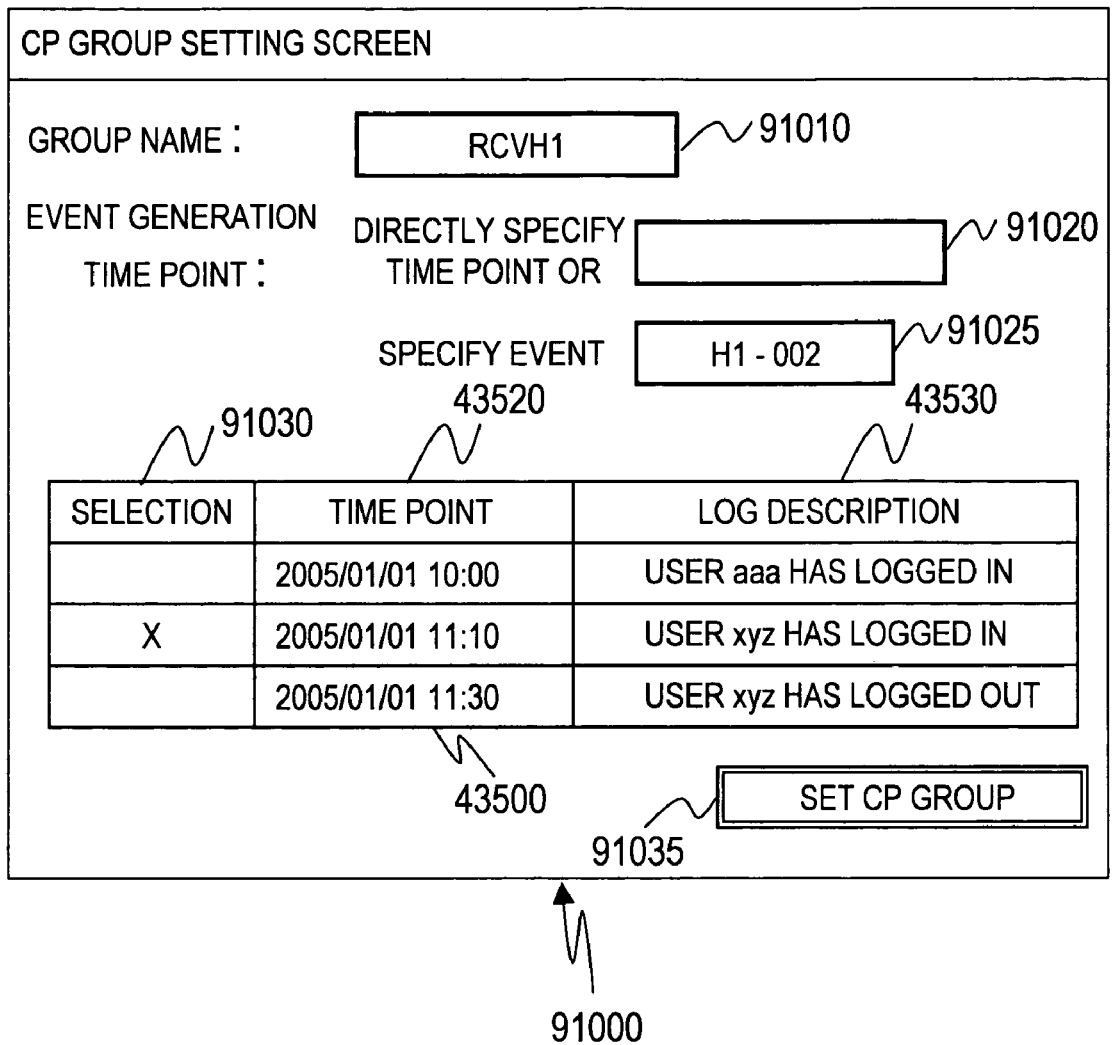
FIG. 26 describes a CP group setting screen displayed by the management computer according to the second embodiment.

FIG. 26 describes the CP group setting screen 91000 displayed by the management computer 40000 according to the second embodiment.

The CP group setting screen 91000 includes a recovery group name input field 91010, a recovery event generation time point input field 91020, an event name input field 91025, the consolidated event log table 43500, an event selection field 91030, and a CP group setting button 91035.

The recovery group name input field 91010, the recovery event generation time point input field 91020, the event name input field 91025, and the CP group setting button 91035 are the same as those of the configuration of the CP group setting screen 91000 according to the first embodiment. Like configurations are denoted by like numerals, and will be explained in no more details.

The management computer 40000 displays the consolidated event log table 43500 partially or entirely in the CP group candidate selection screen 91000. In FIG. 26, the management computer 40000 displays the time points 43520 and the log descriptions 43530 of the consolidated event log table 43500.

The event selection field 91030 is used by the system administrator to select a recovery event. Specifically, the system administrator selects an event for which a recovery is to be executed from the events stored in the consolidate event log table 43500.

When the CP group setting button 91035 is operated, the management computer 40000 recognizes a time point 43520 of the record selected in the event selection field 91030 as an event generation time point. Then, the management computer 40000 carries out the recovery.

According to this embodiment, the system administrator can specify an event generation time point based on information on events which are different from CP's of applications. Moreover, the system administrator can specify a recovery by specifying an event.

The JNL creation program may be executed on the host computer 10000, or on the storage system 20000 in the computer system according to this embodiment as in the first embodiment.

Moreover, the computer system according to this embodiment may include a unit for synchronizing time as in the first embodiment.

This invention can be applicable to a computer system including storage systems and host computers. Especially, this invention is preferably applied to a computer system in a large-scale data center.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
at least one storage system;
at least one host computer that is connected to the storage system via a network; and
a management computer that is connected to the storage system and the host computer, wherein:
the storage system comprises a first interface that is connected to the network, a first processor that is connected to the first interface, a first memory that is connected to the first processor, and a disk drive that stores data to which a write request is issued by the host computer;
the host computer comprises a second interface that is connected to the network, a second processor that is connected to the second interface, and a second memory that is connected to the second processor;
the management computer comprises a third interface that is connected to another device, a third processor that is connected to the third interface, and a third memory that is connected to the third processor;
the second processor executes a plurality of applications;
the first processor provides the host computer with a storage area of the disk drive as at least one logical storage area, allocates the logical storage area to each of the plurality of applications, creates first journal data which is data updated by at least one of the plurality of applications, and creates first check points specific to the first application which are used to maintain consistency of the created first journal data for the applications at a first predetermined timing;
the second processor creates second journal data which is data updated by a second application in the plurality of applications, and creates second check points specific to the second application which are used to maintain consistency of the created second journal data for the second application at a second predetermined timing, wherein the second predetermined timing is different from the first predetermined timing; and
the third processor obtains a common recovery condition which is a condition for check points used to recover the first and second applications, and identifies at least one check point from the first check points that satisfies the common recovery condition for the first application and at least one check point from the second check points that satisfies the common recovery condition for the second application.

2. The computer system according to claim 1, wherein the third processor requests the first processor to perform data recovery using data of time points corresponding to the at least one check point from the first check points and the at least one check point from the second check points.

3. The computer system according to claim 1, wherein:
the common recovery condition comprises an occurrence time point of an event for which a recovery is necessary, and a permissible value of an RPO; and
wherein the at least one check point from the first check points and the at least one check point from the second check points are created between a first time point and the occurrence time point, the first time point being obtained by subtracting the permissible value of the RPO from the occurrence time point.

4. The computer system according to claim 1, wherein:
the common recovery condition comprises a name of an event for which a recovery is necessary, and a permissible value of an RPO;
wherein the third processor obtains event information which indicates a correspondence between a name and an occurrence time point of an event and determines the occurrence time point of the event based on the obtained event information, and
wherein the at least one check point from the first check points and the at least one check point from the second check points are created between a first time point and the occurrence time point, the first time point being obtained by subtracting the permissible value of the RPO from the occurrence time point.

5. The computer system according to claim 1, wherein:
the common recovery condition comprises a permissible value of a time difference between check points; and
wherein a difference between the at least one check point from the first check points and the at least one check point from the second check points is equal to or lower than the permissible value.

6. The computer system according to claim 1, wherein the third processor designates at least a part of the plurality of applications as a recovery group, and when the recovery group is specified, identifies at least one check point which satisfies the obtained recovery condition from the created first and second check points for the respective applications in the recovery group.

7. The computer system according to claim 1, wherein:
the first memory stores a first check point table which indicates information on the created first check point;
the first check point table comprises an identifier for the created first check point, an identifier for a logical storage area for which the first check point is created, an identifier for a base logical storage area which is a copy of the logical storage area at a start time point of the creation of the first check point, a sequence number of the journal data at a creation time point of the first check point, and a creation time point of the first check point;
the second memory stores a second check point table which indicates information on the created second check point; and
the second check point table comprises an identifier for the created second check point, an identifier for a logical storage area for which the second check point is created, and a creation time point of the second check point.

8. A management computer that is connected to at least one host computer for executing plurality of applications, and at least one storage system that is connected to the host computer via a network, comprising:
an interface that is connected to another device, a processor that is connected to the interface, and a memory that is connected to the processor, wherein:
the storage system comprises a disk drive that stores data to which a write request is issued by the host computer, provides the host computer with a storage area of the disk drive as at least one logical storage area, allocates the logical storage area to each of the plurality of applications, creates first journal data which is data updated by a first application in the plurality of applications; and creates first check points specific to the first application which are used to maintain consistency of the created first journal data for the first application at a first predetermined timing;
the host computer creates second journal data which is data updated by a second application in the plurality of applications, and creates second check points specific to the second application which are used to maintain consistency of the created second journal data for the second application at a second predetermined timing, wherein the second predetermined timing is different from the first predetermined timing; and
the processor obtains a common recovery condition which is a condition for check points used to recover the first and second applications, and identifies at least one check point from the first check points that satisfies the common recovery condition for the first application and at least one check point from the second check points that satisfies the common recovery condition for the second application.

9. The management computer according to claim 8, wherein the processor requests the storage system to perform data recovery using data of time points corresponding to the at least one check point from the first check points and at least one check point from the second check points.

10. The management computer according to claim 8, wherein:
the common recovery condition comprises an occurrence time point of an event for which a recovery is necessary, and a permissible value of an RPO; and
wherein the at least one check point from the first check points and the at least one check point from the second check points are created between a first time point and the occurrence time point, the first time point being obtained by subtracting the permissible value of the RPO from the occurrence time point.

11. The management computer according to claim 8, wherein:
the common recovery condition comprises a name of an event for which a recovery is necessary, and a permissible value of an RPO;
wherein the processor obtains event information which indicates a correspondence between a name and an occurrence time point of an event and determines the occurrence time point of the event based on the obtained event information, and
wherein the at least one check point from the first check points and the at least one check point from the second check points are created between a first time point and the occurrence time point, the first time point being obtained by subtracting the permissible value of the RPO from the occurrence time point.

12. The management computer according to claim 8, wherein:
the common recovery condition comprises a permissible value of a time difference between check points; and
wherein a difference between the at least one check point from the first check points and the at least one check point from the second check points is equal to or lower than the permissible value.

13. The management computer according to claim 8, wherein the processor designates at least a part of the plurality of applications as a recovery group, and when the recovery group is specified, identifies at least one check point which satisfies the obtained recovery condition from the created first and second check points for the respective applications in the recovery group.

14. A data recovery method for a computer system comprising at least one storage system, at least one host computer that is connected to the storage system via a network, and a management computer that is connected to the storage system and the host computer, the storage system comprising a first interface that is connected to the network, a first processor that is connected to the first interface, a first memory that is connected to the first processor, and a disk drive that stores data to which a write request is issued by the host computer;

the host computer comprising a second interface that is connected to the network, a second processor that is connected to the second interface, and a second memory that is connected to the second processor;

the management computer comprising a third interface that is connected to another device, a third processor that is connected to the third interface, and a third memory that is connected to the third processor;

the data recovery method comprising the steps of:

executing plurality of applications;

providing the host computer with a storage area of the disk drive as at least one logical storage area;

allocating the logical storage area to each of the plurality of applications;

creating first journal data which is data updated by a first application in the plurality of applications;

creating first check points specific to the first application which are used to maintain consistency of the created first journal data for the first application at a first predetermined timing;

creating second journal data which is data updated by a second application in the plurality of applications;

creating second check points specific to the second application which are used to maintain consistency of the created second journal data for the second application at a second predetermined timing, wherein the second predetermined timing is different from the first predetermined timing;

obtaining a common recovery condition which is a condition for check points used to recover the first and second applications; and identifying at least one check point from the first check points that satisfies the common recovery condition for the first application and at least one check point from the second check points that satisfies the common recovery condition for the second application.

15. The data recovery method according to claim 14, further comprising a step of performing data recovery using data of time points corresponding to the at least one check point from the first check points and the at least one check point from the second check points.

16. The data recovery method according to claim 14, wherein:

the common recovery condition comprises an occurrence time point of an event for which a recovery is necessary, and a permissible value of an RPO; and wherein the at least one check point from the first check points and the at least one check point from the second check points are created between a first time point and the occurrence time point, the first time point being obtained by subtracting the permissible value of the RPO from the occurrence time point.

17. The data recovery method according to claim 14, wherein the common recovery condition comprises a name of an event for which a recovery is necessary, and a permissible value of an RPO, wherein the data recovery method further comprising the steps of:

obtaining event information which indicates a correspondence between a name of the event and an occurrence time point; and determining the occurrence time point of the event based on the obtained event information, and wherein the at least one check point from the first check points and the at least one check point from the second check points are created between a first time point and the occurrence time point, the first time point being obtained by subtracting the permissible value of the RPO from the occurrence time point.

18. The data recovery method according to claim 14, wherein:

the common recovery condition comprises a permissible value of a time difference between check points; and wherein a difference between the at least one check point from the first check points and the at least one check point from the second check points is equal to or lower than the permissible value.

19. The data recovery method according to claim 14, further comprising the steps of:

designating at least a part of the plurality of applications as a recovery group;

specifying the recovery group; and identifying at least one check point which satisfies the obtained recovery condition from the created first and second check points for the respective applications in the recovery group.

* * * * *